United States Patent [19]

Bouyoucos

[11] 4,147,228

[45] Apr. 3, 1979

[54] METHODS AND APPARATUS FOR THE GENERATION AND TRANSMISSION OF SEISMIC SIGNALS

[75] Inventor: John V. Bouyoucos, Rochester, N.Y.

[73] Assignee: Hydroacoustics Inc., Rochester, N.Y.

[21] Appl. No.: 730,752

[22] Filed: Oct. 7, 1976

[51] Int. Cl.² .................................................. G01V 1/14
[52] U.S. Cl. .................................... 181/119; 181/114; 181/120; 181/121; 340/17 R; 340/15.5 TA
[58] Field of Search ............... 181/113, 114, 119, 121; 340/15.5 TA; 175/1

[56] References Cited

U.S. PATENT DOCUMENTS

| | | | |
|---|---|---|---|
| 2,808,577 | 10/1957 | Crawford et al. | 340/15.5 TA |
| 3,130,809 | 4/1964 | Flatow | 181/114 |
| 3,209,854 | 10/1965 | Williams | 181/121 |
| 3,283,845 | 11/1966 | Kenney | 181/114 |
| 3,283,846 | 11/1966 | Lundall et al. | 181/114 |
| 3,326,320 | 6/1967 | Forester | 340/15.5 TA |
| 3,332,512 | 7/1967 | Sundt | 340/15.5 TA |
| 3,369,519 | 2/1968 | Bricout | 181/120 |
| 3,392,369 | 7/1968 | Dickie et al. | 181/120 |
| 3,394,775 | 7/1968 | Cole et al. | 181/120 |
| 3,564,492 | 2/1971 | Magneville et al. | 340/12 R |
| 3,697,938 | 10/1972 | Taner | 340/15.5 TA |
| 3,840,090 | 10/1974 | Silverman | 181/119 |
| 3,895,343 | 7/1975 | Farr | 340/15.5 TA |
| 4,004,267 | 1/1977 | Mayne | 340/15.5 TA |
| 4,006,795 | 2/1977 | Anstey | 181/121 |
| 4,034,333 | 7/1977 | Cunningham | 340/15.5 TA |

FOREIGN PATENT DOCUMENTS 1258562 1/1969 United Kingdom ..................... 181/114

OTHER PUBLICATIONS

"The Pulsed Vibrator as a Seismic Source", Evison, *Geophysical Prospecting*, Dec. 1957, pp. 381-391.

*Primary Examiner*—Howard A. Birmiel
*Attorney, Agent, or Firm*—Martin LuKacher

[57] ABSTRACT

Methods and apparatus for generating and transmitting seismic signals for the purpose of seismic exploration are disclosed. The signals are force pulses shaped to have a spectrum constrained to the range of frequencies which are necessary for penetration to desired depths within the earth and for resolution of the geological reflection surfaces therein. These pulses are provided in a non-repetitive or aperiodic train, constructed to produce a transmitted energy spectrum whose mean energy extends smoothly at a substantially constant level over the spectrum frequency range, notwithstanding that the repetition frequency of the pulses may be swept over a frequency band much narrower than the spectrum range. The transmitted spectrum can exhibit an auto-correlation function having a major lobe which is predominant over any side lobes, corresponding to a desired level of resolution of the geological reflection surfaces.

37 Claims, 35 Drawing Figures

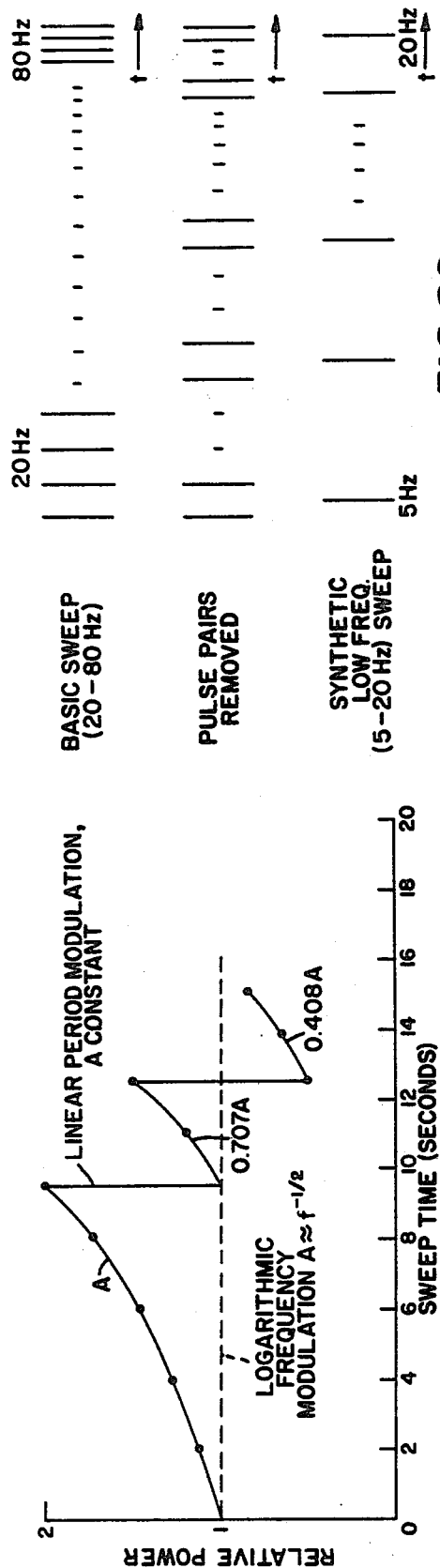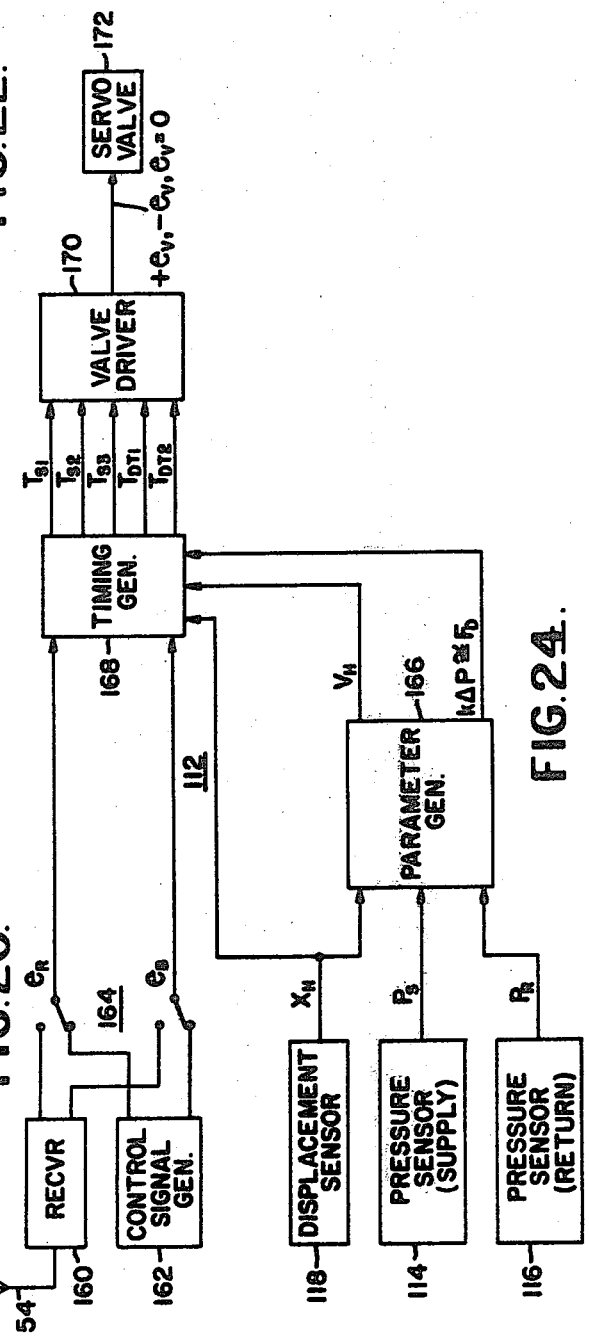

METHODS AND APPARATUS FOR THE GENERATION AND TRANSMISSION OF SEISMIC SIGNALS

The present invention relates to methods of and apparatus for generating and transmitting seismic signals. The invention also relates to methods and apparatus for generating seismic signal sequences which maximize the energy transmitted from the available power source and provide for high resolution of geological reflection surfaces which minimum ambiguity.

The present invention is especially suitable for use in geophysical exploration through the use of elastic wave propagation within the earth. The invention may also have application generally in sensing and detection systems which make use of acoustic transmissions.

The art of seismographic surveying has fostered the development of various types of seismic signal sources and exploration techniques. Nevertheless, the properties of existing sources and techniques, when coupled with the earth's characteristics as an acoustic signal transmission medium, are found to limit the speed of survey advance, the signal-to-noise ratios obtained and the geophysical resolution achieved.

The most widely used method of deep seismic exploration on land is the so-called "Vibroseis" technique in which a hydraulic vibrator applies to the earth formation a linear sweep of frequencies covering generally the range of one to four octaves. Upon reception, correlation techniques are used to resolve and locate reflection events (reflections from geological reflecting surfaces). A general survey of such techniques, as well as of techniques using dynamite or similar impulsive events, may be found in Farr, U.S. Pat. No. 3,886,493.

Typically, the vibrators are mounted with their hydraulic power supplies on heavy-duty vehicles. Such vehicles are used frequently in groups of two to six with the vibrators driven synchronously to generate the desired transmission. Efforts have been made to increase the amplitude of the vibrations and to lower their frequencies for deeper penetration. This has resulted in larger vehicles which are more costly to operate and maintain. Reference may be had to Bedenbender et al, U.S. Pat. No. 3,929,206 and to Mifsud et al, U.S. Pat. No. 3,363,720 for a description of such vibration generating equipment. Additionally, effective deep seismic exploration requires that synthetic spatial arrays of such sources be deployed. Typically, a group of four Vibroseis vehicles, which may move along the line of the geophone array, make contact with the earth in unison every twenty feet or so, executing during each contact a synchronized, linear sweep of 5 to 15 seconds duration from a lower frequency in the vicinity of 5 Hz to an upper frequency in the range of 60 Hz. Usually, ten or more of these contact sets constitutes the equivalent of a single "shot point", which is a term derived from the use of explosives in seismic exploration. In order to resolve deep reflecting surfaces, the groups of recordings of signals received by the geophone array from each contact set, must be processed, correlated, and stacked in order to obtain seigmograms suitable for analysis by geologists of the geological structure (see Cassand and Lavergne, "Seismic Emissions by Vibrators" which appears as Chapter 8 in the text, *Seismic Filtering*, published by Soc. of Exploration Geophysicists, Tulsa, Okla. (1971)).

The advantage of the spatial distribution of transmissions resides in the relative increase of compressional (P) wave energy coupled to the earth, which is generally considered useful energy for seismic exploration purposes, and the concurrent, relative reduction of shear (S) wave and Rayleigh (surface) wave energy, which otherwise appears as a noise background at the geophone array (see Miller and Pursey, "On the Partition of Energy Between Elastic Waves in a Semi-Infinite Solid", Proc. Roy. Soc. A, 233, 55–69 (1955)). The driving point impedances (and hence transfer functions) that are presented by the earth at each contact point may be different due to the highly irregular weathering layer that exists over most surface areas of the earth. As a result, the use of multiple contacts may also help to smooth the spectral character of the composite transmitted signal.

In a typical vibratory source contact, a compressive bias force of the coupling plate against the earth may, for example, be 30,000 pounds. Superimposed on this compressive bias force may be a time-varying force, of, for example, 20,000 pounds peak amplitude. The instantaneous force will then vary between 10,000 and 50,000 pounds. The impedance of the ground may vary as a function of the force applied and thus contribute to a distortion of the transmitted signal which serves to contaminate the seismogram or at a minimum appear as an increased noise background therein.

Although the electrohydraulic swept frequency transmission into the earth, as above described, provides for deep seismic exploration, even with the benefit of arrays of sources, the power conversion process is inefficient and expensive. It has been estimated that approximately 1/10 of 1% or less of the prime energy generated for the hydraulic vibration generator finds its way into the ground as useful seismic energy for exploration purposes.

An additional drawback of the vibrator vehicles is their size. They are frequently too large and cumbersome to be useful in rugged or wooded areas, their use being generally limited to relatively open, smooth terrain. Accordingly, resort must be had to explosive devices, such as dynamite, exploding gas mixtures, and release of high-pressure air, in the more inaccessible areas. The use of such devices can have adverse environmental effect. Moreover, exploration procedures using such devices are frequently slower than with vibratory techniques.

Other techniques that have been employed include the dropping of large weights on the earth surfaces, and refinements of such impact producing techniques through use of pneumatically accelerated rams. To achieve adequate signal strength, a large number of such pulses, taken at different surface positions, are frequently summed together in the acquisition process and only a composite pulse recorded for later processing and display. Generally, in the compositing of these individual pulses, a smeared and distorted resultant pulse occurs from the destructive cancellation of the higher frequency components. The resultant is difficult to time accurately. Reference may be had to the above mentioned Farr patent and to Mayne, U.S. Pat. No. 3,367,443 (now U.S. Pat. No. Re. 27,418) for a showing of such weight dropping techniques, and to Kenney, U.S. Pat. No. 3,283,845 (now U.S. Pat. No. Re. 26,825) for a showing of a pneumatic actuator. Special coupling elements, such as proposed in the above mentioned Mayne patents, can be used to reduce damage to the coupling plate, but fail to provide seismic signals which can be efficiently injected into and transmitted through the earth by virtue of their poor and inefficient spectral characteristics.

It has been proposed to improve weight dropping and even explosive source signal transmission techniques through the use of coded transmissions (see Barbier and Viallix, "Pulse Coding in Seismic Prospecting — Sosie and Seiscode", Geophysical Prospecting, 22, 153-175 (1974), and U.S. Pat. Nos. 3,811,111; 3,866,174; and 3,956,730). These methods provide for pulse transmissions at specific times during reception intervals, according to a particular code, with processing configured to align the receptions such that the correlation noise is minimized. These techniques can be limiting on the power injected into the earth. The rate of data collection (viz., the speed of survey advance) is also limited with such techniques.

It is an aim of this invention to generate and transmit unipolar force pulses for seismic exploration in a manner which obviates many of the limitations of prior techniques. A sequence of force pulses can transmit a given rate of energy flux(power) to the earth at a substantially reduced static thrust or bias level, relative to a sine wave (analog) vibrator. This can, in turn, result in reduced equipment size and platform requirements, resulting in enhanced mobility. As will also be shown, the efficiency of generation of force pulse events can be high, and the system efficiency can be high. With the signal formats provided in accordance with the invention, using if desired appropriate spatial distribution of contacts, seismic signals generated and transmitted in accordance with the invention will provide exceptional penetration and signal-to-noise ratio, unambiguous resolution of geological structure of interest, and cost effective rate of survey.

It is, therefore, a feature of this invention to provide methods and means for generating seismic signals which may readily be injected or coupled into the earth, and which upon transmission may readily be used to resolve unambiguously the reflection surfaces.

A further feature of this invention is to provide methods and apparatus for generating, as seismic signals, aperiodic sequences of impulse events, which provide high signal to noise and which are adapted to provide seismograms with high resolution, and which signals also can be transmitted over a short time interval at high energy rates.

Another feature of the invention is to provide methods and apparatus which maximize the power in the seismic signal energy relative to the power available, as from a prime power source such as a diesel engine, while achieving high resolution seismograms with cost-effective processing and analysis of the received seismic signals.

Still another feature of the invention is to provide methods of and apparatus for generating seismic energy through relatively small amplitude events, such as small impulse events. The signals may be generated in such form, in accordance with the invention, by highly mobile equipment, which may be used in rugged terrain.

Still another feature of the invention is to provide methods and apparatus for providing seismic signals in the form of sequences of impulse events in accordance with code formats which are more efficient, in terms of total energy transmitted in a given interval of time, than are code formats previously proposed.

It is still another feature of the invention to provide methods and apparatus for seismic signal generation and transmission which permit a high rate of data collection (viz., to reduce the time required for completion of a seismic survey).

Briefly described, the invention affords methods and means for generating from impact events, force pulses. These force pulses are translated into seismic signals having a spectrum constrained to the range of frequencies which is both necessary and desirable for use in a seismic exploration system, particularly when penetration of seismic energy deeply into the earth is desired. More particularly, these seismic signals may be generated by shaping force pulses generated in response to impact events produced as by a pressurized fluid driven hammer, such that the spectral energy of the force pulse is within the desired range.

An aperiodic train or sequence of such spectrally constrained force pulses having a predetermined format provides both the energy and the spectral characteristics necessary for penetration and resolution. Each force pulse may be small enough in energy to be produced by highly-mobile equipment. The sequence of pulses in accordance with the format enables transmission of sufficient seismic energy signals to obtain a large signal to noise ratio while also leading to high resolution. More specifically, the sequence of pulses covers a repetition frequency band or bands so as to construct the transmitted spectrum uniformly over the entire frequency range of the seismic exploration system while the band or bands themselves extend over a much smaller range. The repetition frequency of these pulses and/or the amplitude thereof, is, in accordance with a preferred form of the invention, varied such that the mean spectrum level extends smoothly (i.e., is substantially constant) from the lower to the upper frequency limit of the frequency range. This signal spectrum is characterized by an auto-correlation function which has very narrow main lobe and small, if any, side lobes; which is commensurate with high resolution in the seismogram constructed by cross-correlation of the received signals with the transmitted energy.

Energy is conserved (for increased efficiency), since the band width of the transmitted spectrum may be restricted to be only so wide as is commensurate with the recording and processing band width of the seismic exploration system. Time for data collection in the field can be reduced since the impulse sequences may be carried out over short transmission intervals at high energy rate. The energy spectrum is naturally tapered by the shape of the force pulse so as to essentially eliminate ringing of the minor lobes of the auto-correlation function thereby further enhancing the resolving properties of the transmission.

The apparatus provided by the invention for generating the pulses and the pulse sequence formats mentioned above may include a percussive source whose percussive action derives from hammer motion controlled by a switched force, rather than a vibratory hydraulic source. The switched force characteristics may be provided by switching hydraulic pressure across the hammer in contrast to the sinusoidal or analog valving necessary in vibratory source techniques such as characterize the "Vibroseis" technique mentioned above. This further enhances the efficiency of the apparatus. In addition, the efficiency is enhanced by utilizing a force-pulse shaping apparatus which recovers energy not transmitted to the formation through rebound of the hammer, which rebound energy may be applied to the generation of the next force pulse.

In accordance with one embodiment of the invention, a substantially constant mean spectrum level over the spectrum frequency range is obtained by modulating or sweeping the force pulse repetition frequency so that the power input to the force pulse generator remains constant over the duration of the sweep. Alternatively, the constant mean spectrum level may be generated by modulation of the repetition frequency of the force pulses such that the generator accepts a changing power input suitable for energy storage power supplies.

It has been found, in accordance with the invention, that improved coupling, notwithstanding the non-linear characteristics of the earth formation, may be obtained by impacting the surface regions and reducing the force amplitude after compaction to obtain a more linear load. Such force reduction occurs naturally when the power output is maintained substantially constant during the period of an upward sweep of repetition frequency. The power output is the product of blow energy (which is a function of amplitude of the force pulses) and the frequency of the blows. For constant power output, as the repetition frequency increases, the blow energy reduces inversely with frequency. Thus, compaction occurs during the early high energy blows at low repetition frequency with a more linear elastic load being presented by the formation toward the end of the sweep.

The foregoing and other features, objects, and advantages of the present invention as well as the mode of operation and the presently preferred embodiments thereof will become more apparent from a reading of the following specification in connection with the accompanying drawings in which FIG. 1 is a front view of a vehicle equipped with apparatus for producing seismic signals in accordance with the invention;

Figure 2:
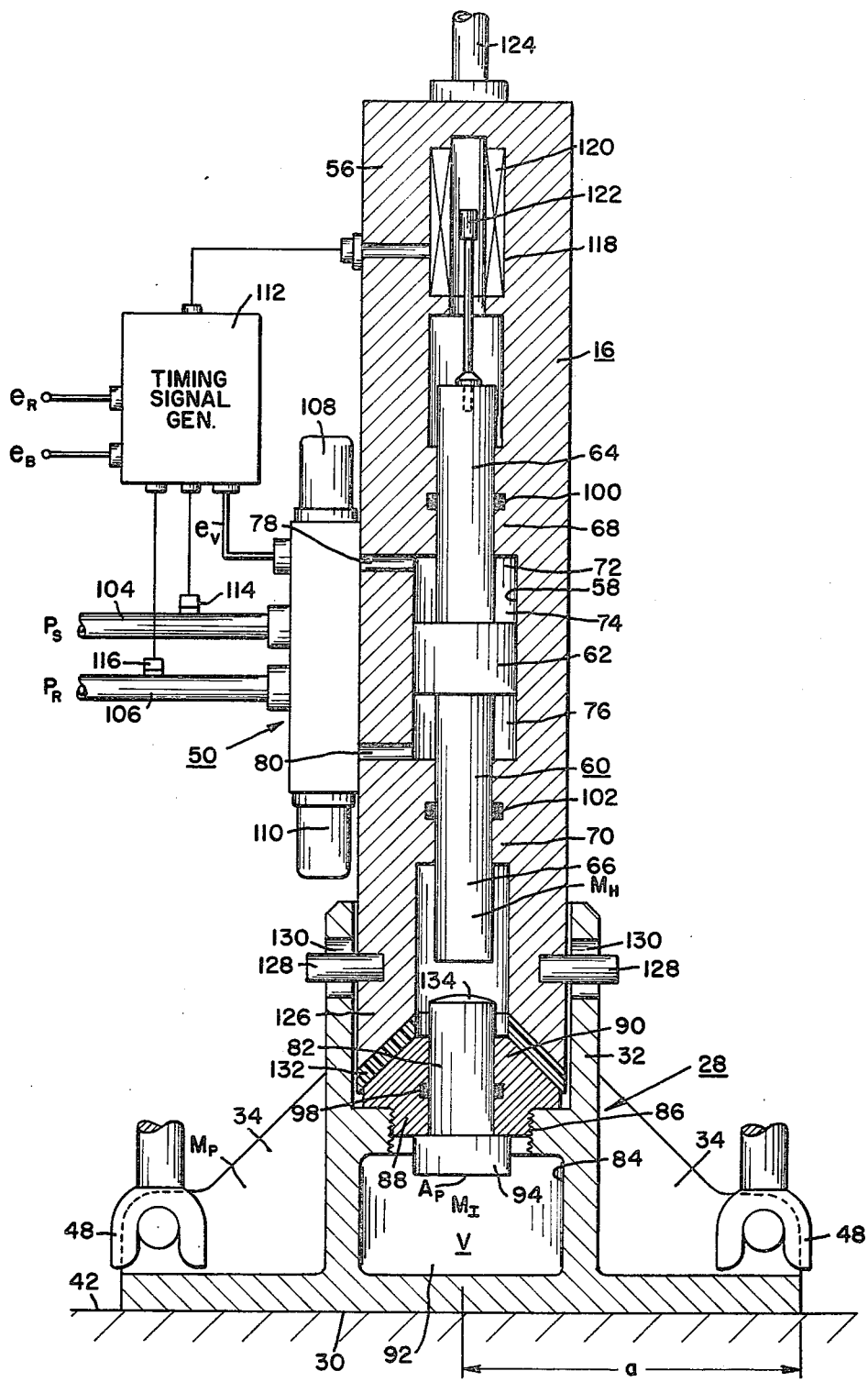
FIG. 2 is a sectional view, schematically showing the apparatus for generating seismic signals which is shown mounted on the vehicle in FIG. 1, but in greater detail.
Figure 8:
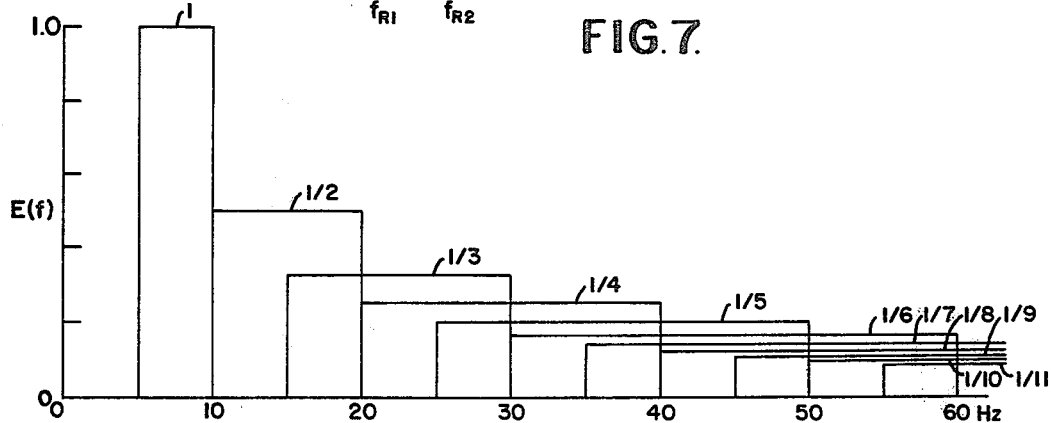
FIG. 8 is a diagram illustrating harmonically related bands or panels resulting from a force pulse sweep from 5 to 10 Hz.
Figure 10:
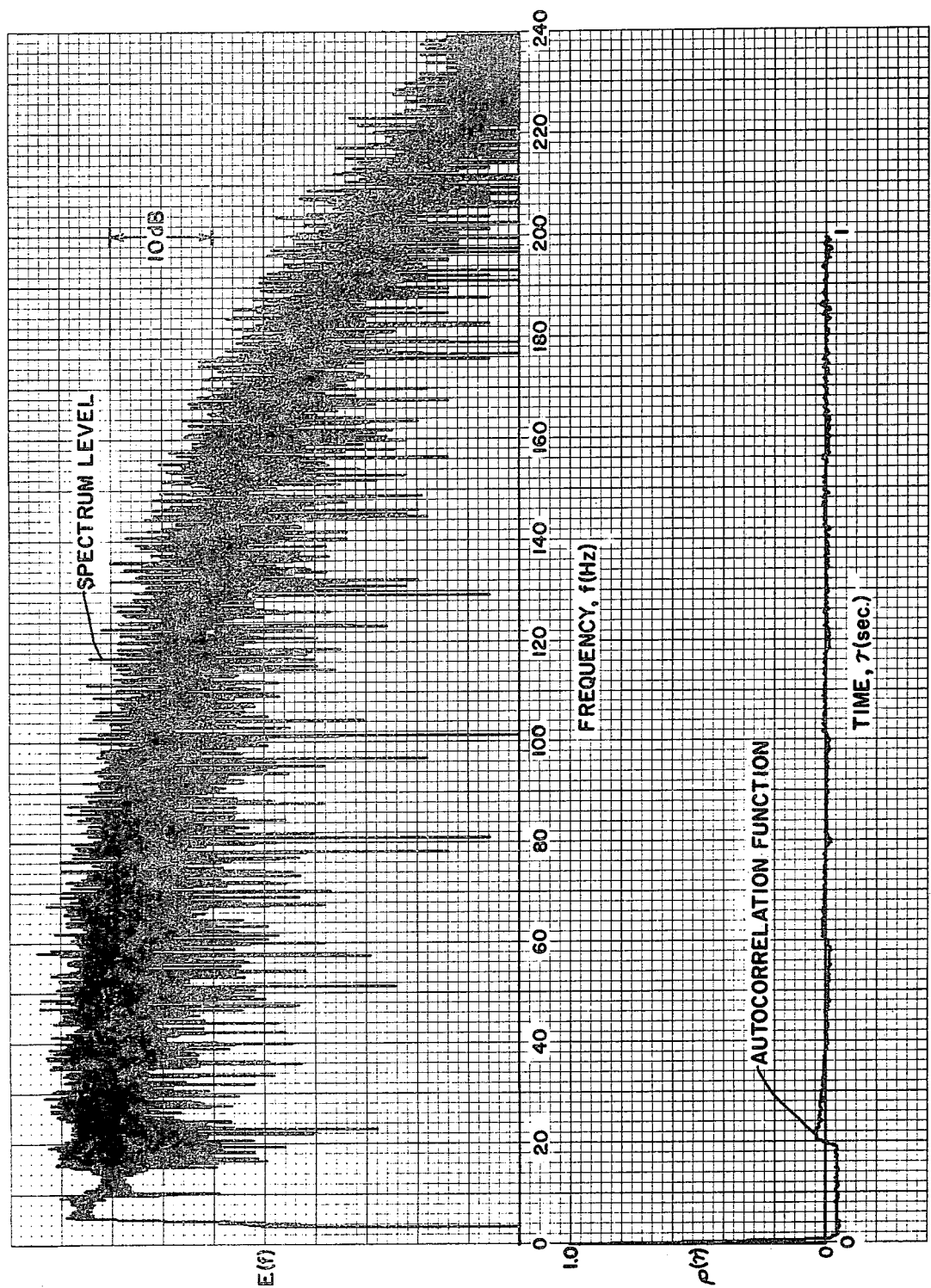
Figure 11:
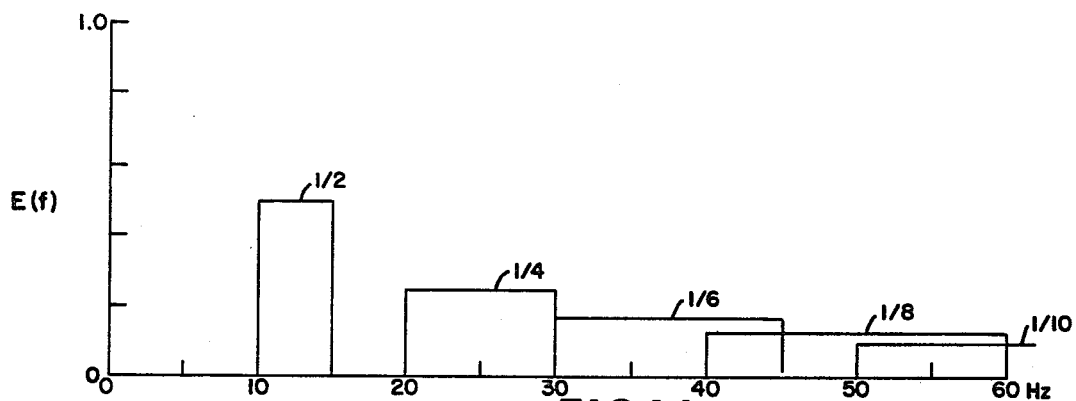
Figure 12:
Figure 13:
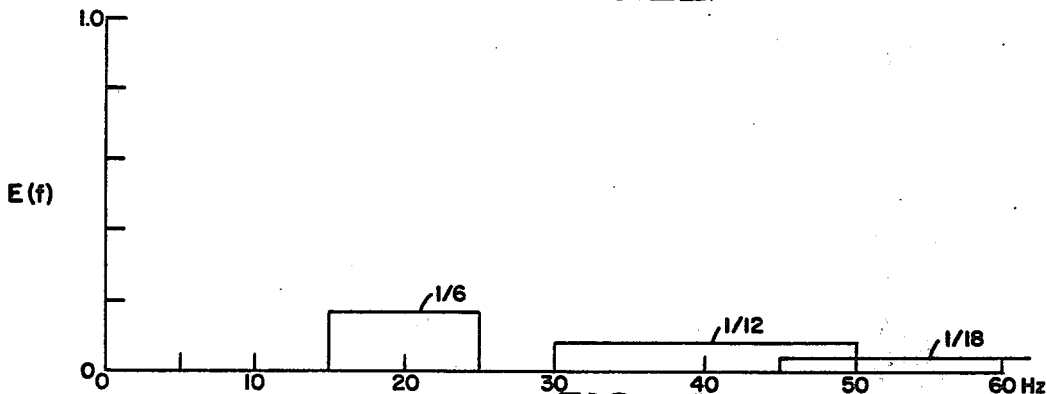
Figure 14:
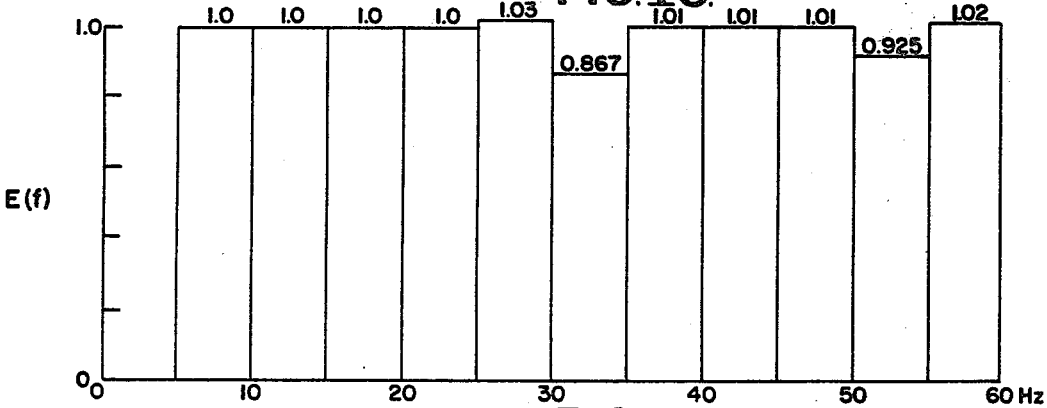
Figure 15:
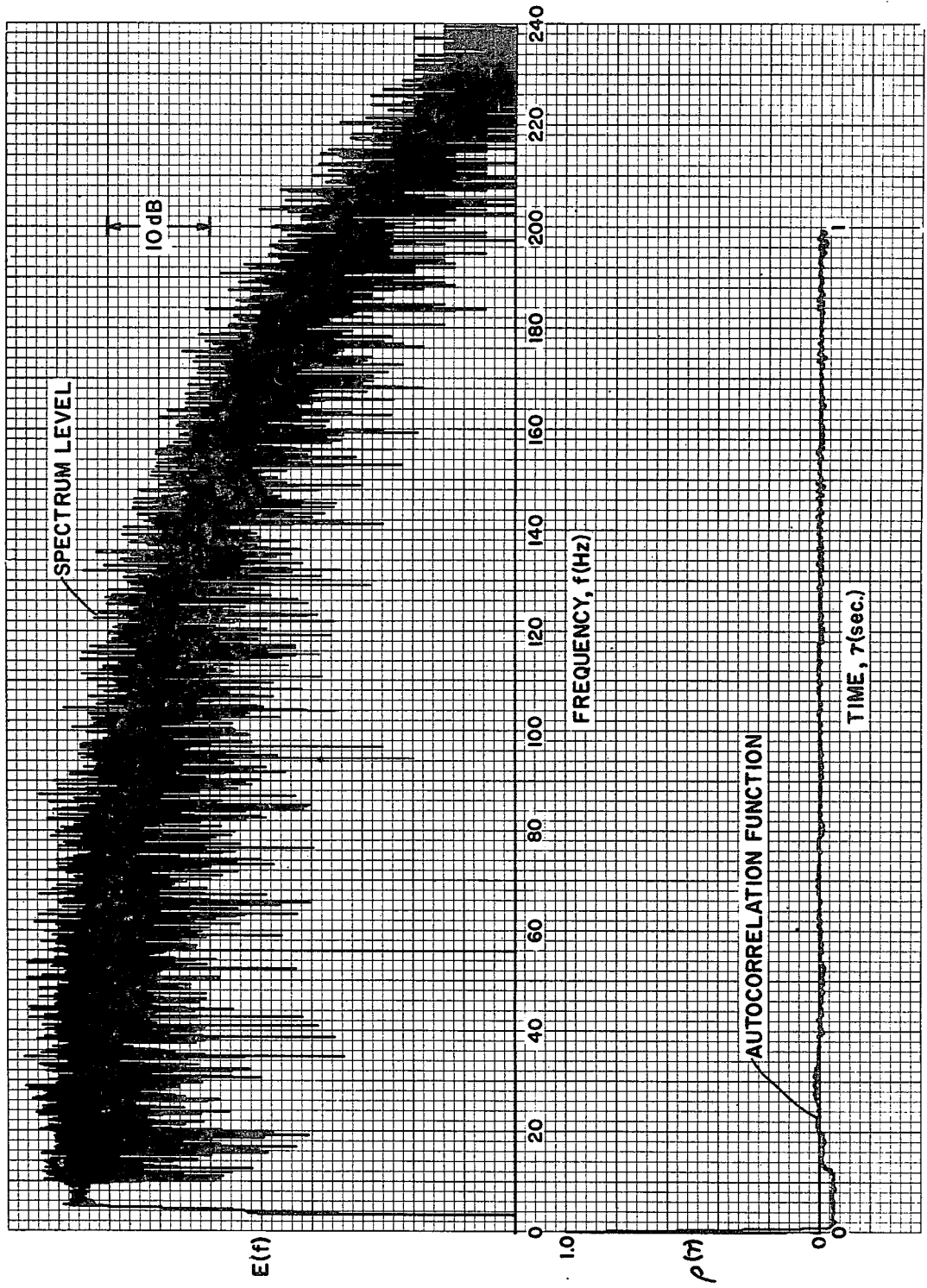
Figure 16:
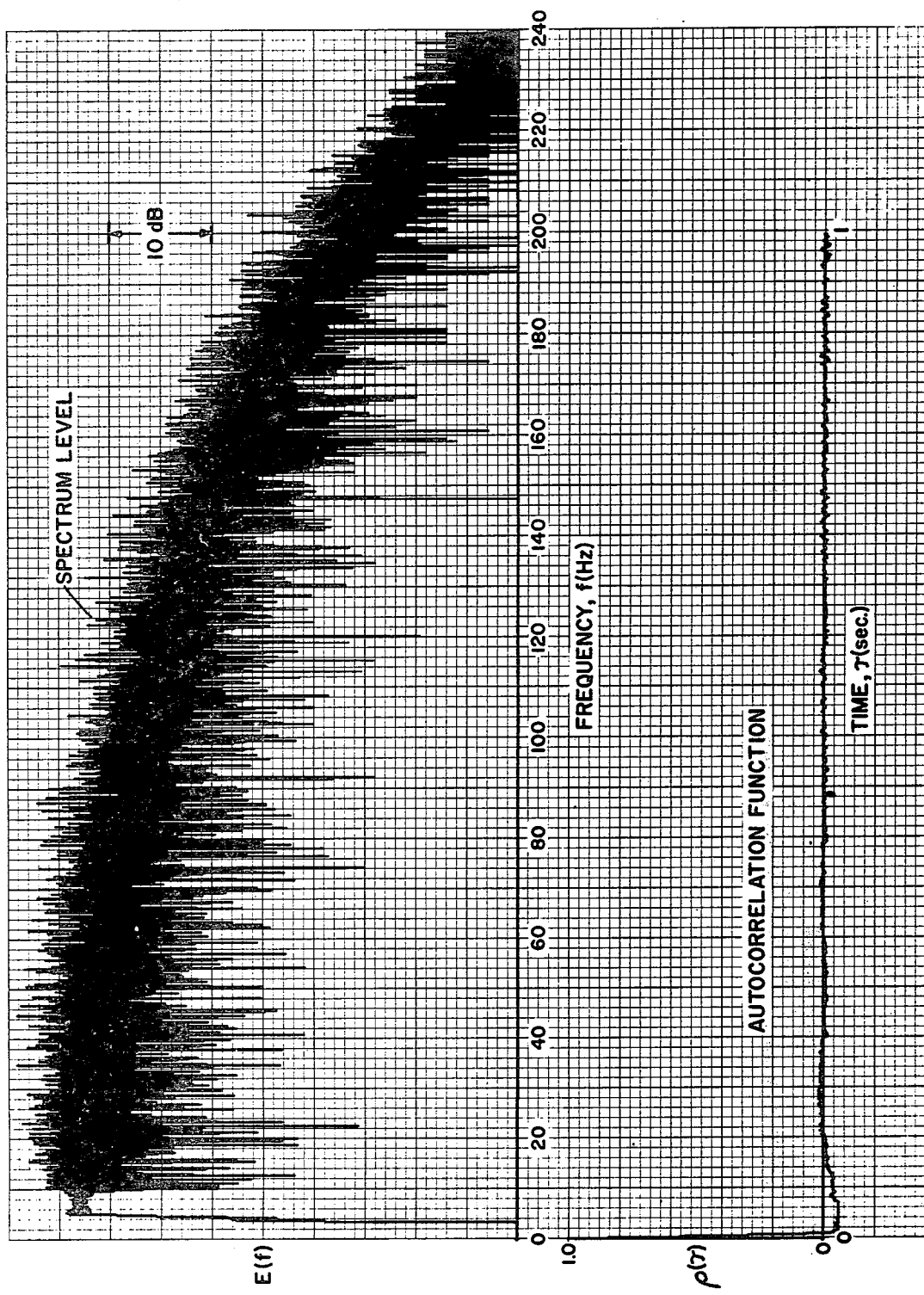
Figure 17:
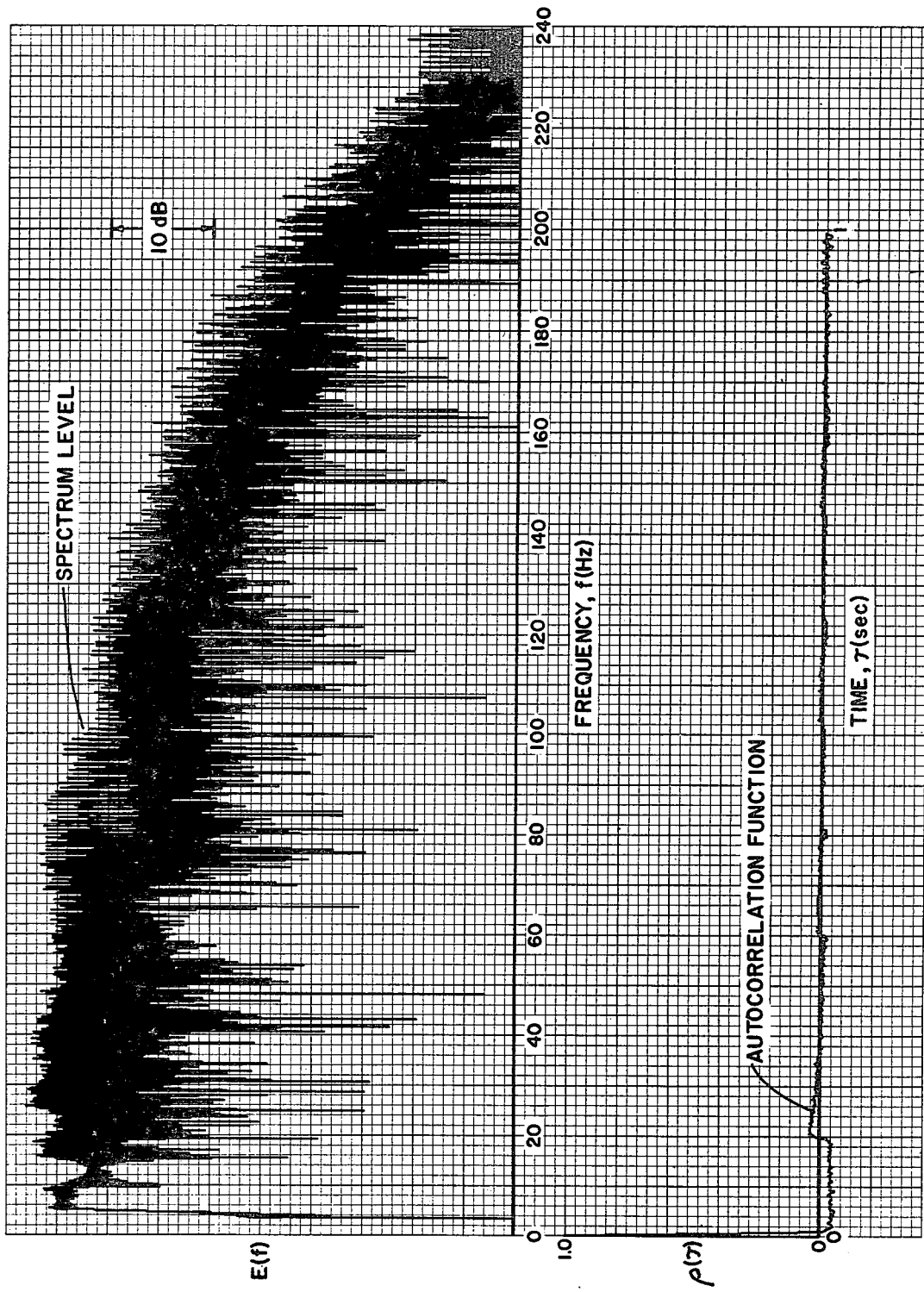
Figure 18:
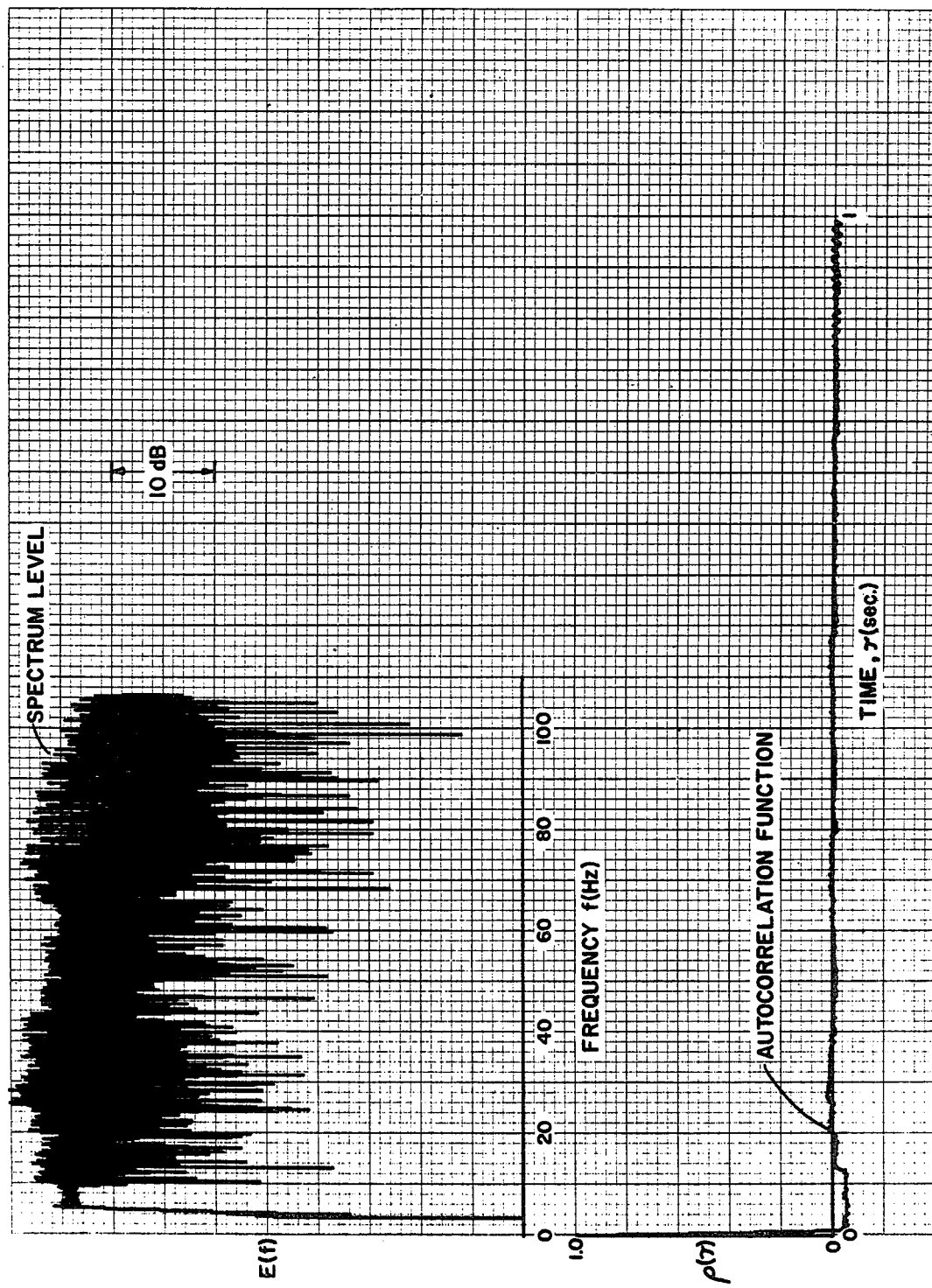
Figure 19:
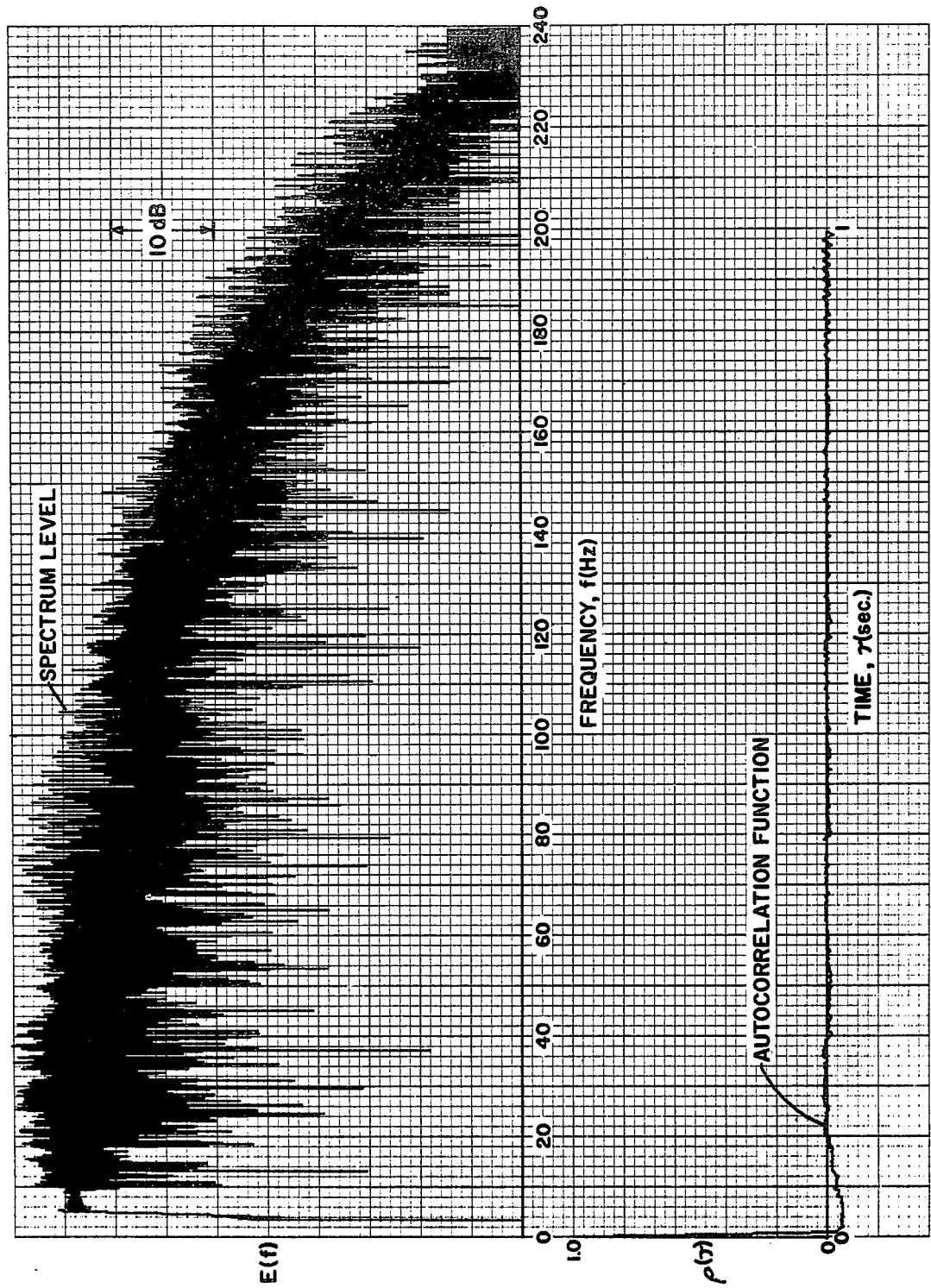
Figure 21:
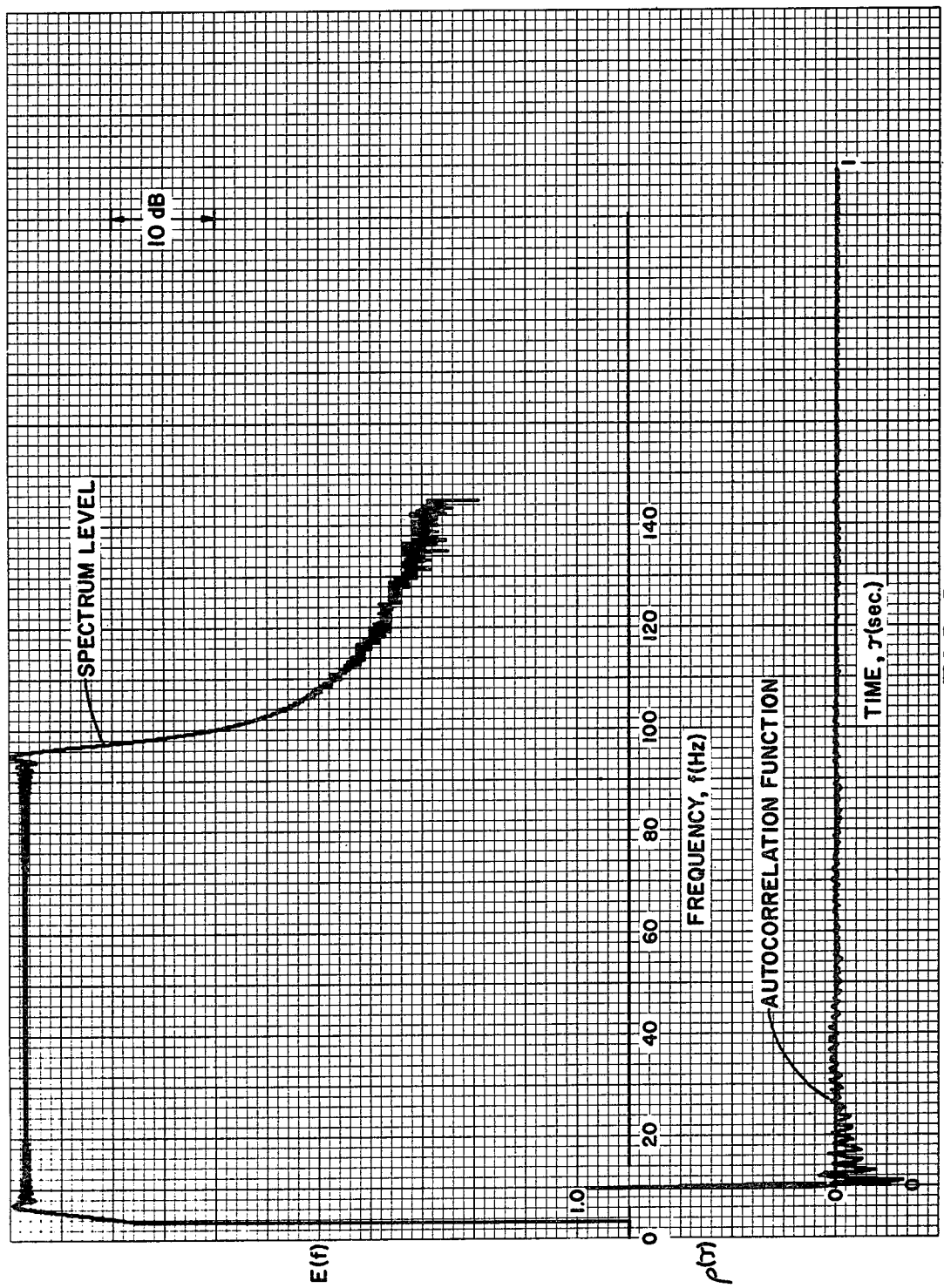
Figure 23:
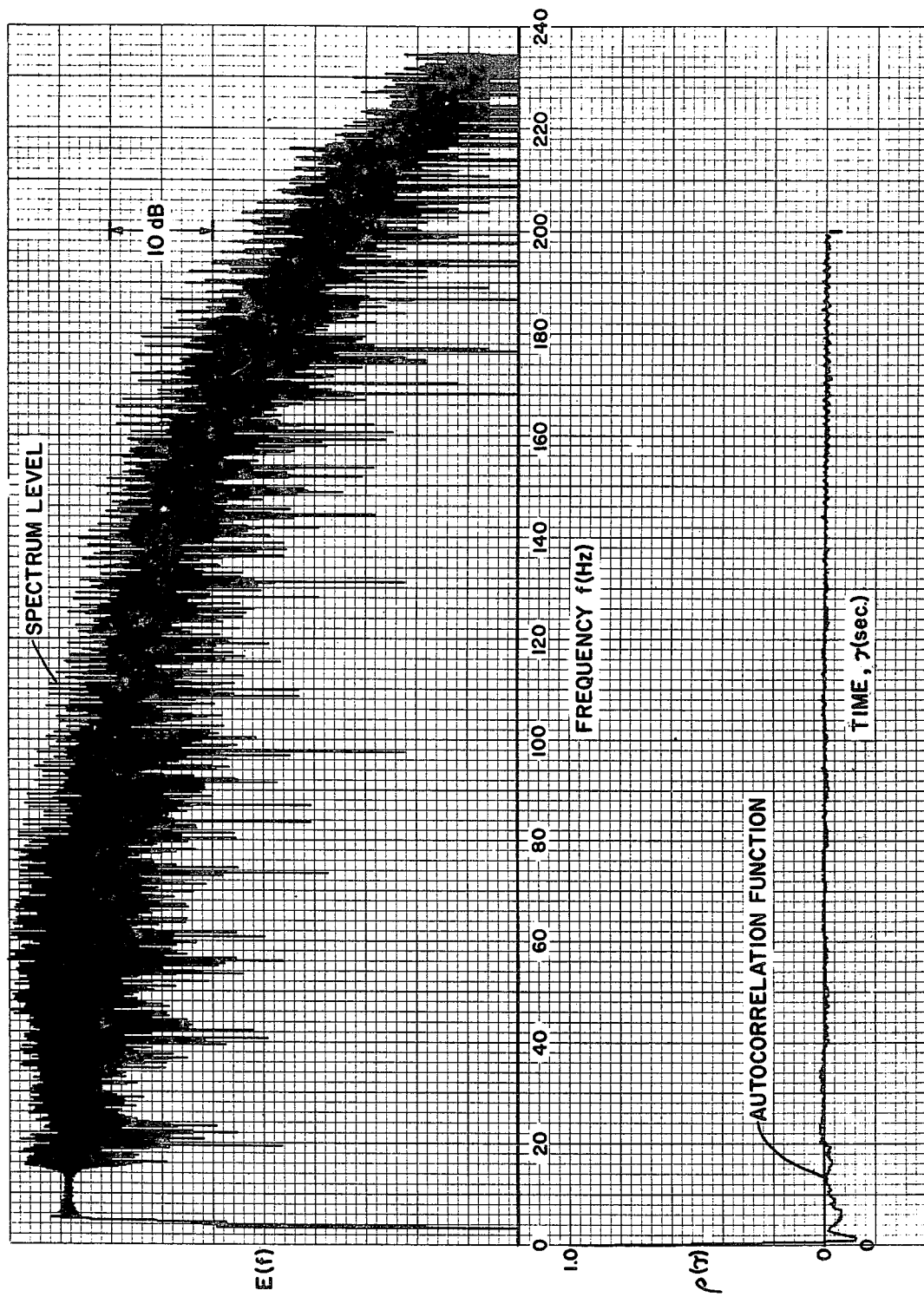
Figure 23A:
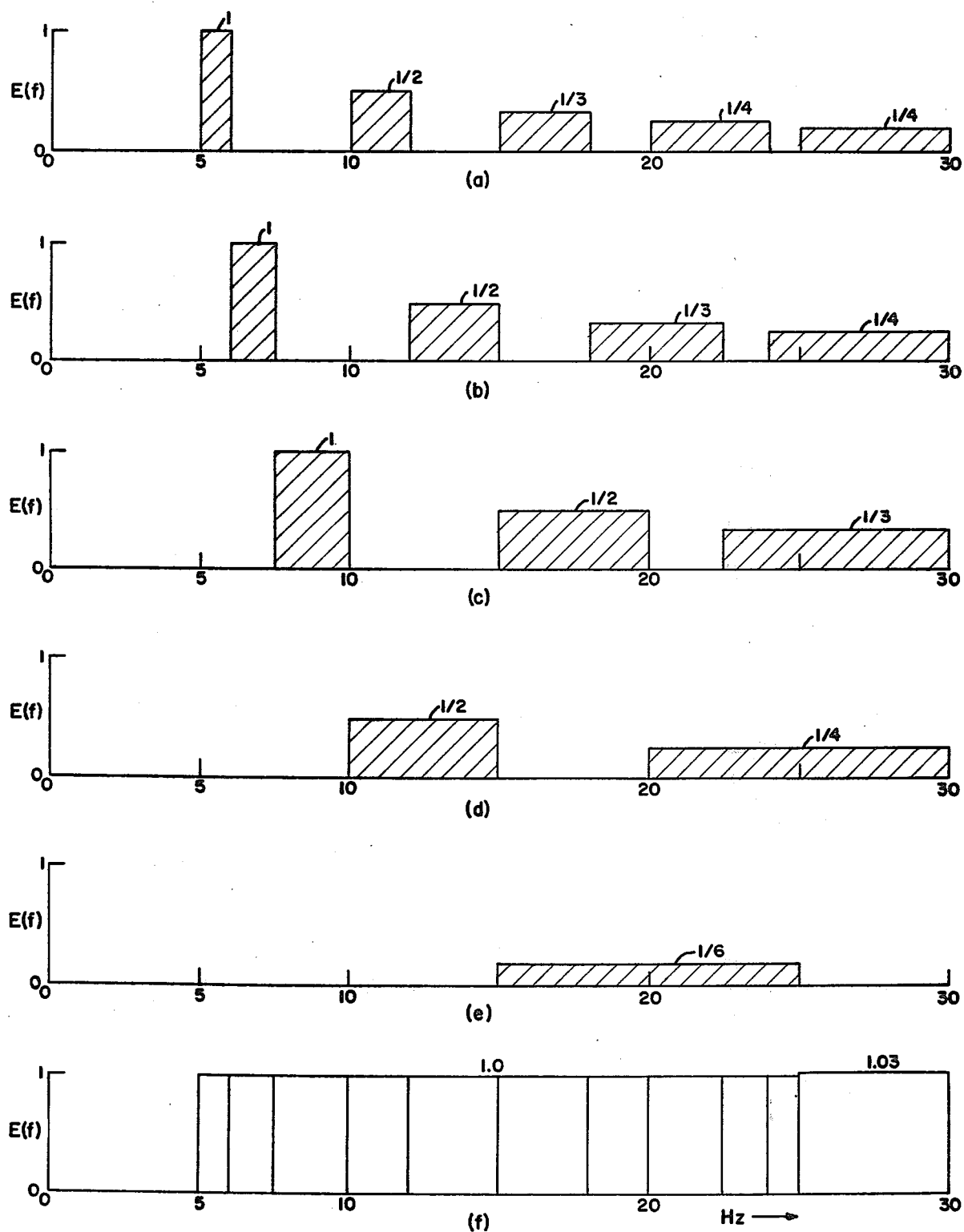
Figure 24A:
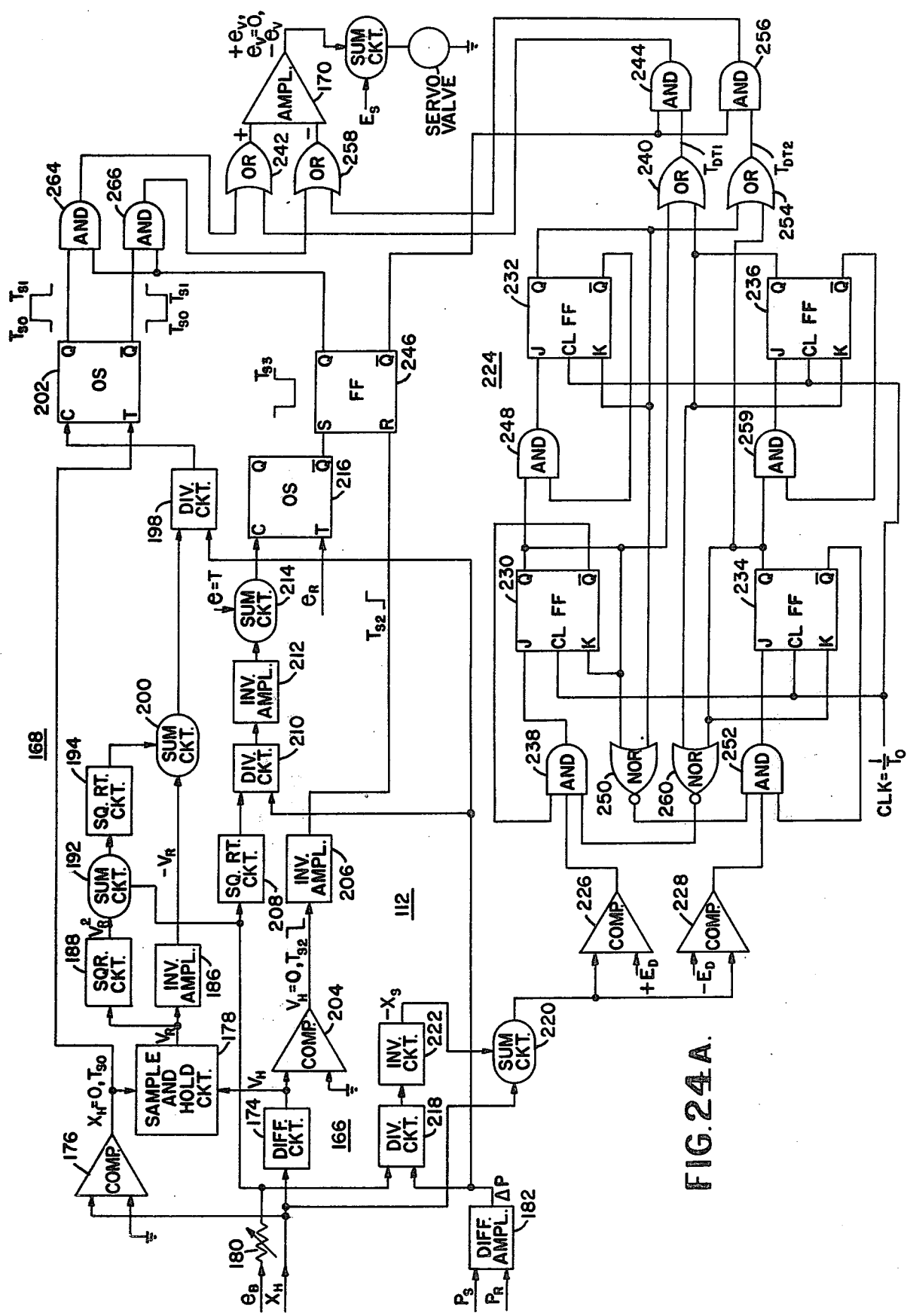
Figure 26:
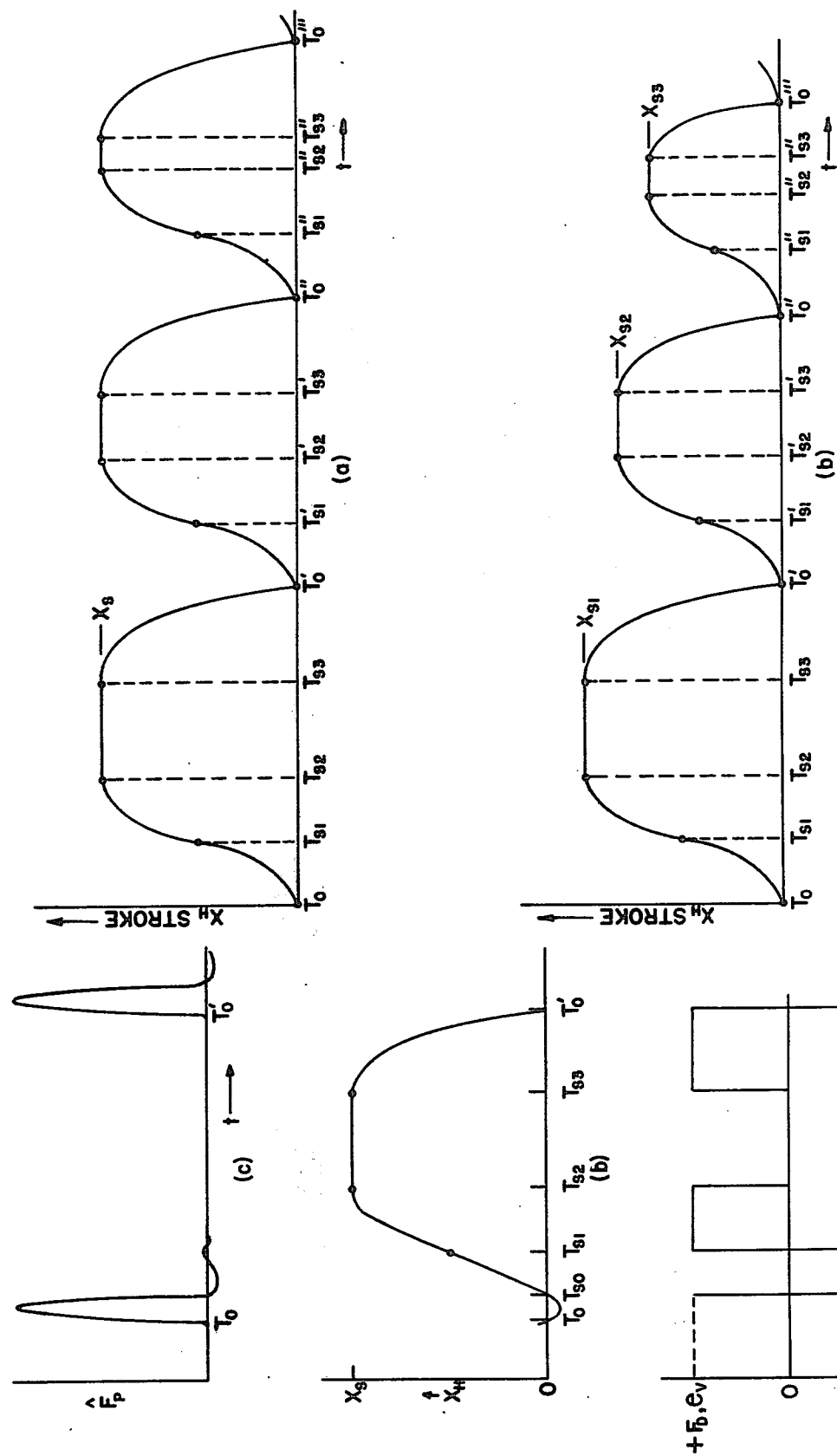
Figure 25:
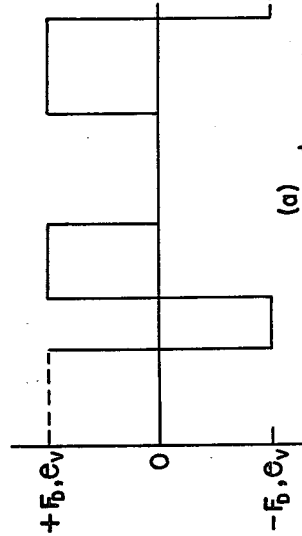
Figure 27:
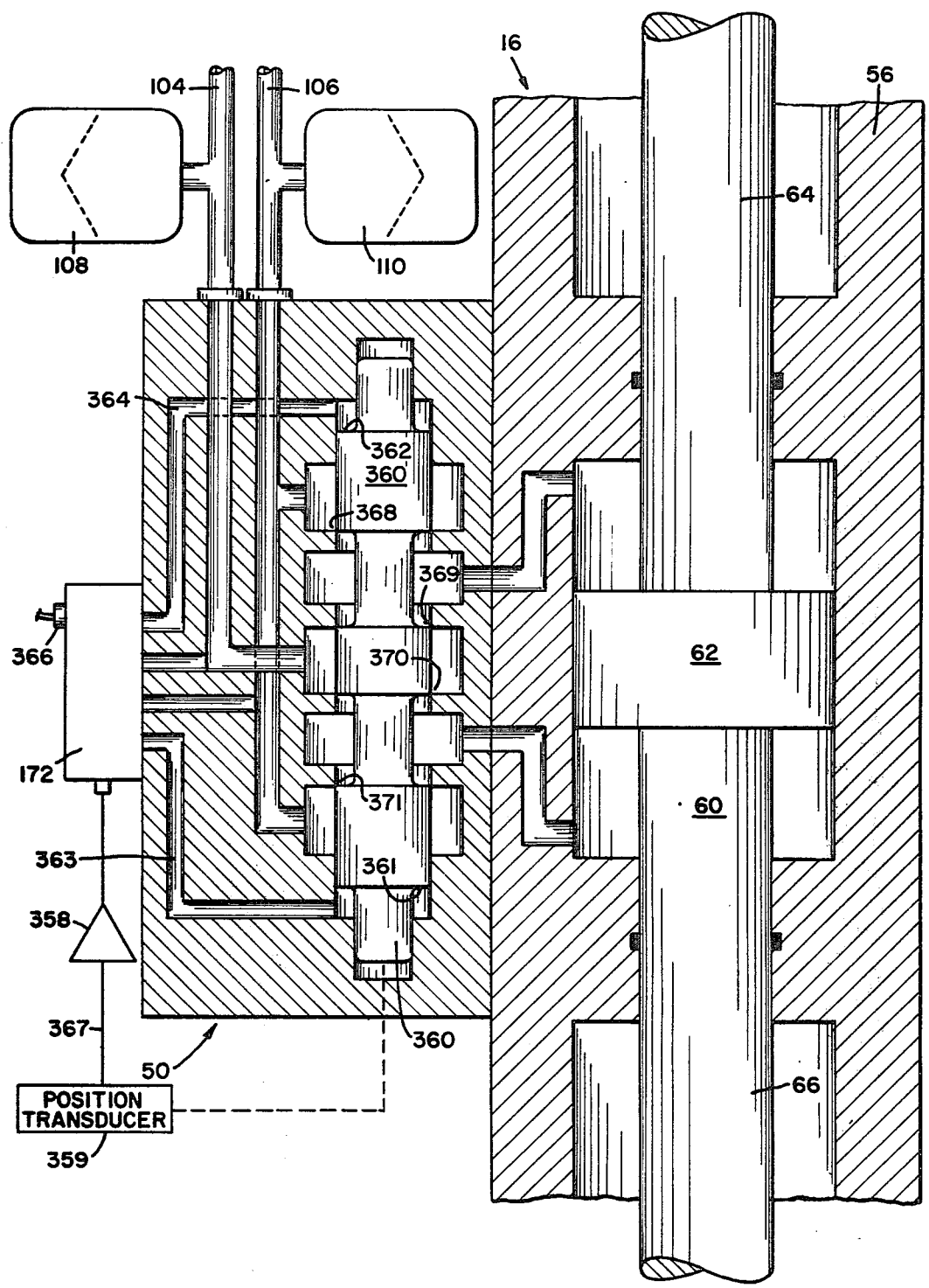
Figure 28:
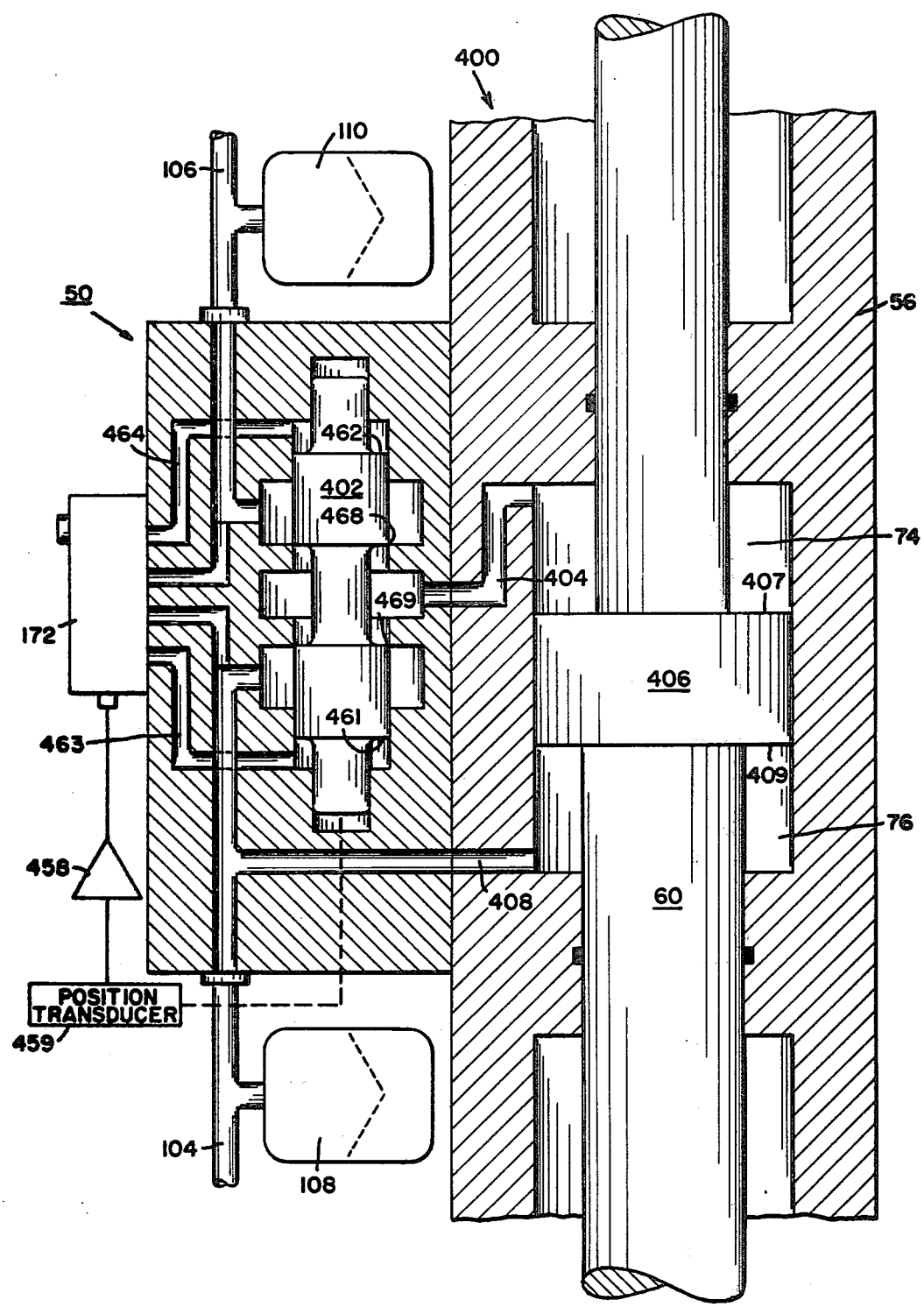
Figure 29:
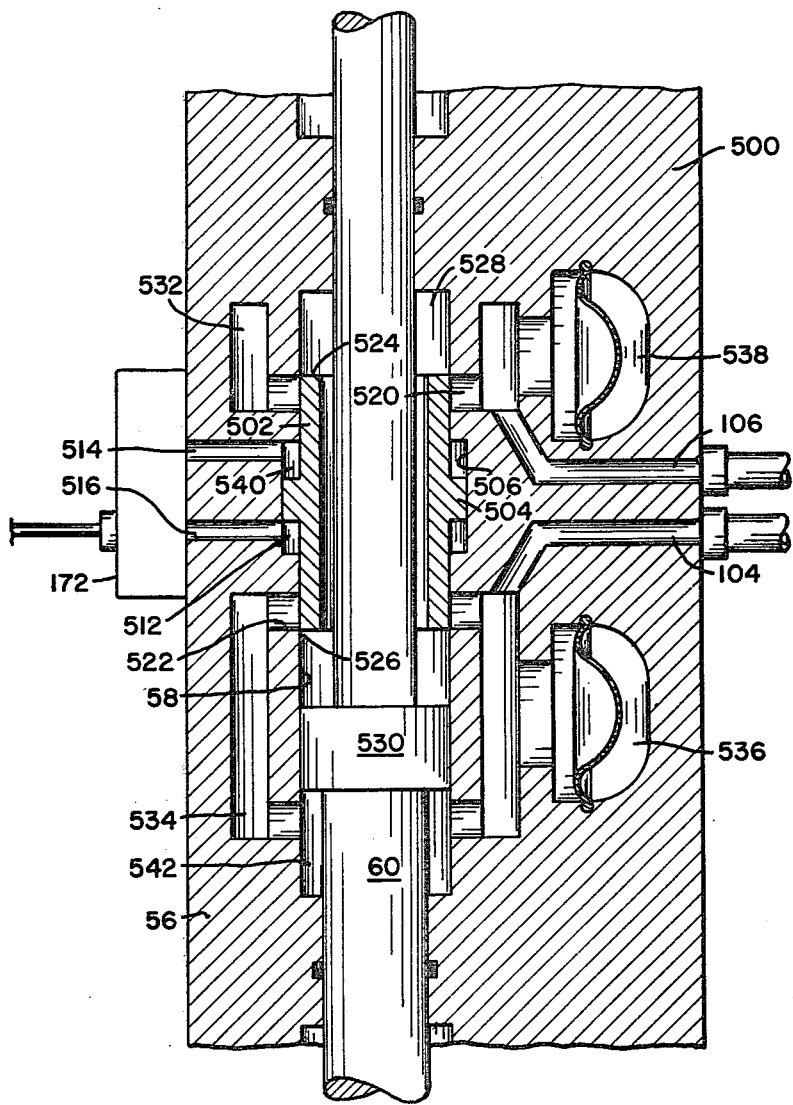
Figure 30:
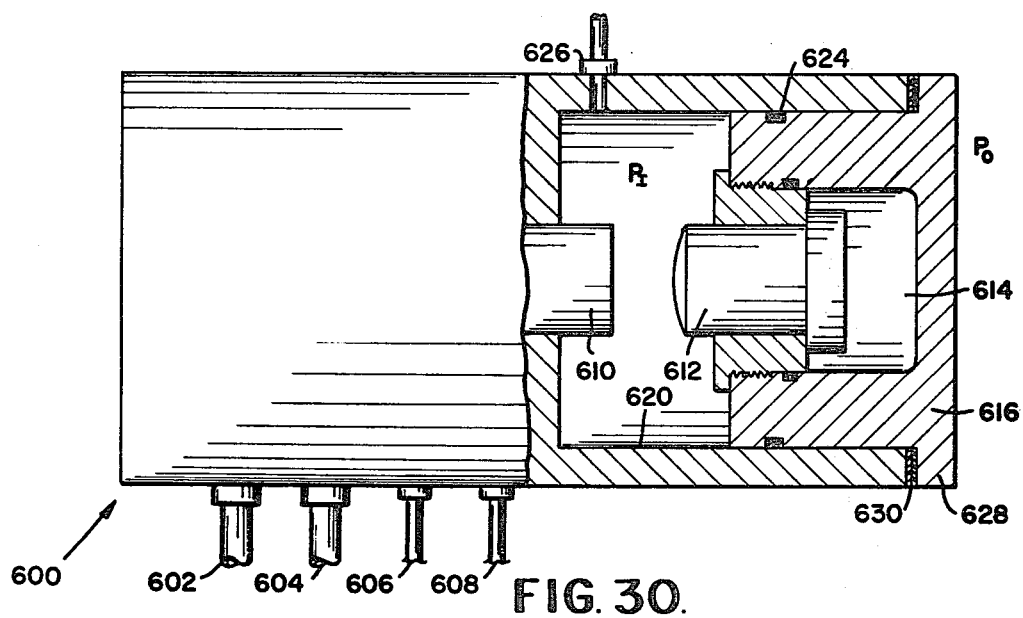
Figure 31:
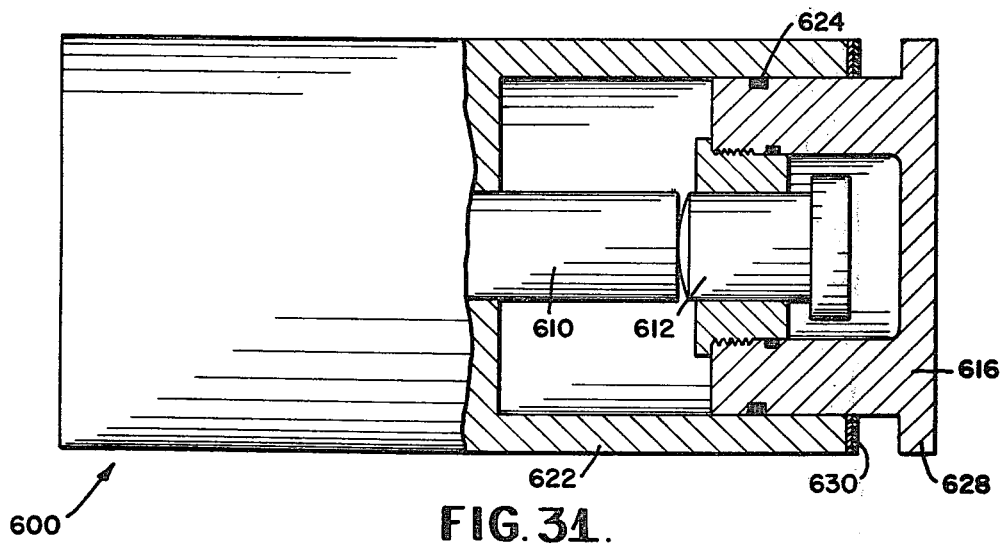
Figure 32:
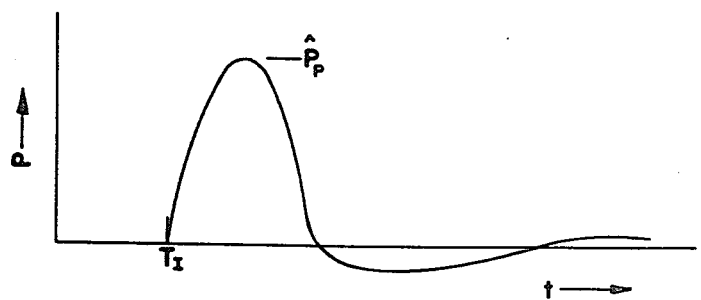

FIG. 10 is a diagram illustrating the energy spectrum and auto-correlation function resulting from a sweep of force pulse repetition rate over a band from 5 to 10 Hz where the repetition rate is modulated in frequency logarithmically, the force pulse amplitude varying in accordance with the reciprocal of the square root of the frequency and the pulse itself has a duration of approximately 8 milliseconds;

FIG. 11 illustrates the harmonic panels resulting from a sweep of force pulses over a 10 to 15 Hz repetition frequency band where the spectral level in this band is one-half the level of the fundamental band shown in FIG. 8;

FIG. 12 illustrates the energy spectrum generated by the incoherent summation of the harmonic panels shown in FIGS. 8 and 11;

FIG. 13 illustrates the harmonic panels resulting from a sweep of force pulses over a 15 to 25 Hz repetition frequency band where the spectral level in this band is one-sixth the level of the fundamental band shown in FIG. 8;

FIG. 14 is a diagram indicating the energy spectrum obtained by an incoherent summation of the harmonic panels shown in FIGS. 8, 11 and 13;

FIG. 15 is a diagram similar to that shown in FIG. 10 where the spectrum results from sequential sweeps over the two fundamental bands of 5 to 10 Hz and 10 Hz to 15 Hz, showing the coherent combination of the harmonic panels illustrated in FIG. 12;

FIG. 16 is a diagram similar to FIG. 15 where the sweep extends sequentially from 5 to 25 Hz showing the coherent combinations of the three harmonic panel set illustrated in FIG. 14;

FIG. 17 is a diagram similar to the diagram of FIG. 10 but showing the spectrum and auto-correlation function obtained where the modulation of the frequency of the band from 5 to 10 Hz is a linear period modulation;

FIG. 18 is a view similar to FIG. 17 where the band over which the frequency of the pulses is swept in accordance with linear period modulation extends from 5 to 15 Hz;

FIG. 19 is a diagram similar to FIG. 18 but where the band over which the linear period modulation sweep extends is from 5 to 25 Hz;

FIG. 20 is a graph which illustrates the relative output power of the signal generating apparatus in each of two typical cases, where the force-pulse frequency is varied in accordance with linear period modulation and also where the force pulse frequency is varied in accordance with logarithmic frequency modulation;

FIG. 21 is a diagram similar to FIG. 10 for a sweep produced by a "Vibroseis" type vibratory signal generator;

FIG. 22 is a timing diagram illustrating a series of pulse trains generated in accordance with the invention, in a manner whereby a spectrum of 5 to 80 Hz may be generated through the use of a sweep over a band from 20 to 80 Hz;

FIG. 23 is a diagram illustrating the spectrum and auto-correlation functions obtained from a force pulse train of the format shown in FIG. 22, where the frequency of the pulses has linear period modulations and the alternate pulse pairs are removed as shown in FIG. 22;

FIG. 23A is a diagram illustrating non-overlapping harmonic panels and the spectrum resulting from the summation thereof;

FIG. 24 is a block diagram, schematically illustrating the system for generating electrical control signals for operating the control valve which is used in the apparatus shown in FIG. 2;

FIG. 24A is a more detailed block diagram of the system shown in FIG. 24;

FIG. 25 are timing diagrams illustrating the time relationship of the control signals generated by the apparatus shown in FIG. 24 to the displacement of the hammer shown in FIG. 2 and to the force pulses;

FIG. 26 are diagrams, illustrating the hammer displacement with time, which show how the frequency of the force pulses and their amplitudes may be varied by means of the apparatus illustrated in FIGS. 2 and 24;

FIG. 27 is a fragmentary sectional view, which schematically illustrates apparatus similar to that shown in FIG. 2 for generating the force pulses, but having a four-way valve power stage for hammer excitation;

FIG. 28 is a view similar to FIG. 27 which illustrates a three-way valve power stage adapted to switch hyraulic fluid so as to drive a differential hammer;

FIG. 29 is a view similar to FIGS. 27 and 28 illustrating a switched force hydraulic hammer having a power stage valve surrounding the hammer;

FIG. 30 is a fragmentary perspective view illustrating a force-pulse generator adapted for producing shaped force pulse sequences in underwater environments;

FIG. 31 is a view similar to FIG. 30 but showing the apparatus in position after an impact has taken place; and FIG. 32 is a waveform of the pressure pulse produced by the apparatus shown in FIGS. 30 and 31.

Figure 1:
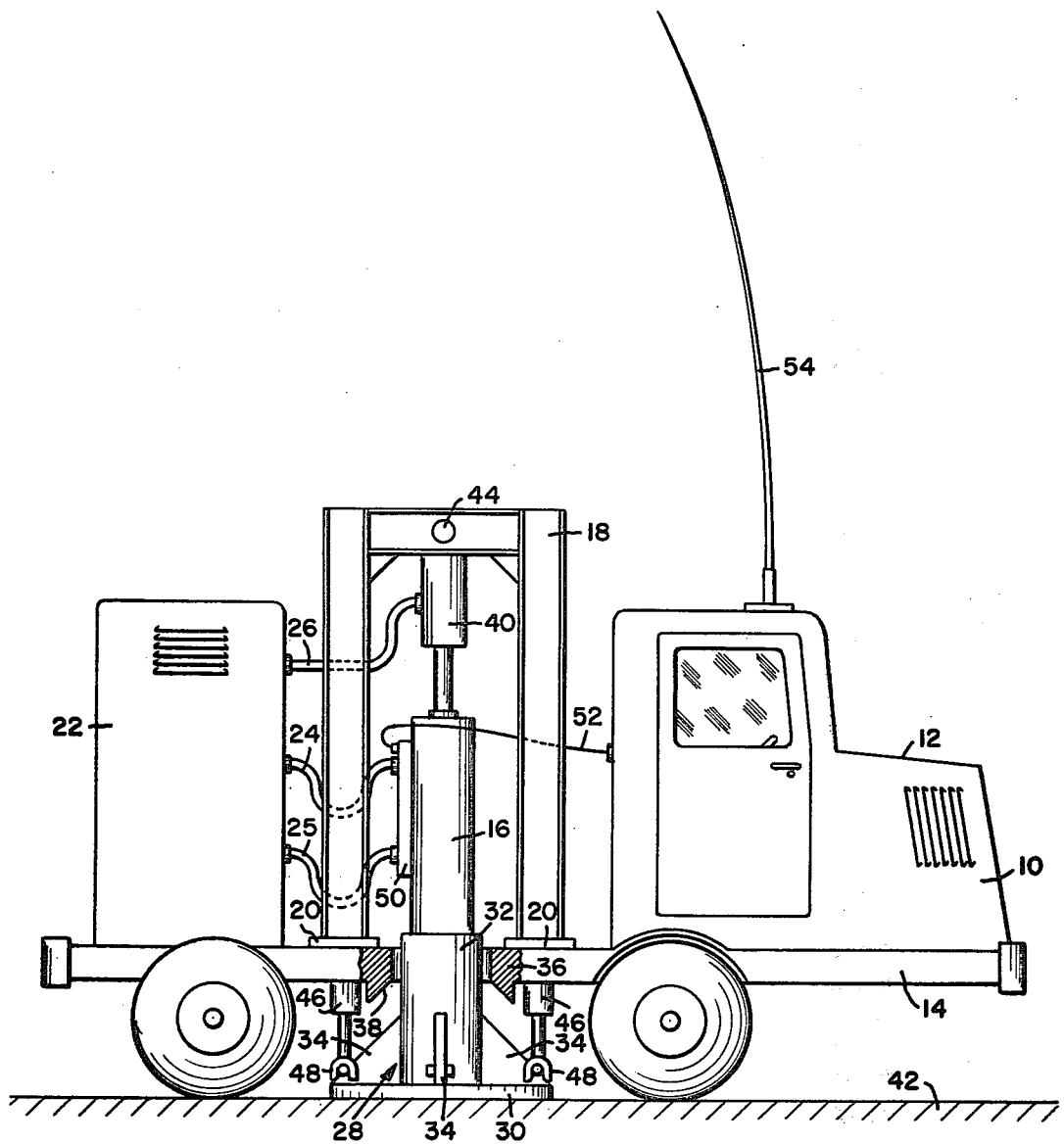

Referring more particularly to the drawings, there is shown in FIG. 1 a mobile system for generating and transmitting the desired seismic signals into the earth. An overland carrier truck 10 has an engine and cab 12 mounted on a chassis which forms a bed 14. A hydraulically driven percussive or impact device serves as a force pulse generator 16. A framework 18 mounted on the bed 14 by means of flanges 20 supports the pulse generator 16. A hydraulic power supply 22 is also mounted on the bed 14. This power supply contains a suitable hydraulic pump, reservoirs and filters for developing pressurized hydraulic fluid, such as hydraulic oil, which is supplied to and received from the pulse generator 16 through hoses 24 and 25. Other hoses 26 connect the hydraulic power supply 22 to the pulse generator apparatus. The pump in the hydraulic power supply 22 may be driven by power take-off from the engine of the carrier 10 or by an auxiliary diesel or gasoline engine, which may be mounted on a trailer adapted to be hauled by the carrier 10.

A base plate assembly 28 forms part of the pulse generator 16. This assembly is made up of a circular base plate 30, a cylinder 32 attached to the top of the base plate 30 and gussets 34. The gussets secure the cylinder 32 to the base plate 30. An opening 36 in the bed 14 is provided with a saddle 38 having a conical surface at the bottom thereof. A hydraulic cylinder 40 serves to raise and lower the pulse generator 16. When the pulse generator 16 is raised, the saddle 38 receives the sloping upper surfaces of the gussets 34. Then the carrier 10 may move over the surface of the ground 42, as to the next contact point.

Figure 4:
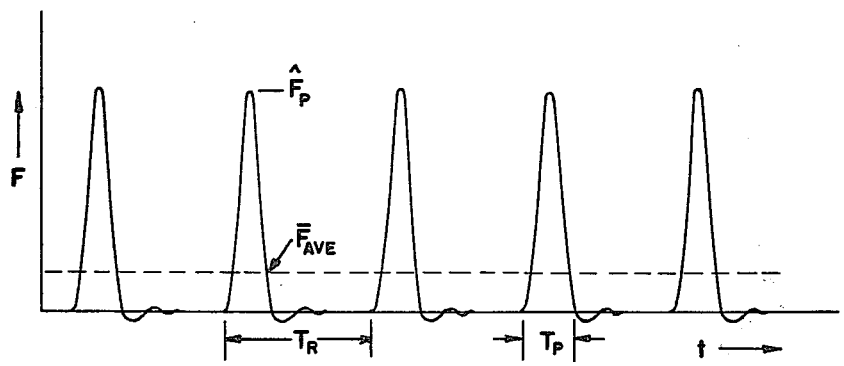
FIG. 4 is a wave form diagram illustrating one sequence of force pulses generating by the apparatus shown in FIGS. 1 through 3.

The hydraulic cylinder 40 is desirably mounted to the framework 18 by means of a swivel or gimbal mount 44. When the carrier arrives at a position of desired signal transmission, the cylinder 40 lowers the pulse generator 16 and its base plate assembly 28 to the ground 42 and applies a bias force thereon which is suitably a multiple (for example 1½ or 2 times the average force of the force pulses which are to be transmitted). This average force is indicated as $\bar{F}_{AVE}$ in FIG. 4. Additionally, this bias force applied by the cylinder 40 may be supplemented by further bias force applied directly to the base plate 30 by means of additional cylinders 46. Three or four of such cylinders are symmetrically disposed around the base plate 30. They are mounted on the bed 14, as for example by a shock absorber and swivel mount similar to the mount 44, and have shafts with slotted engagement members 48 which contact pins on the base plate 30 to provide symmetrical loading thereon. This supplemental bias, by means of the cylinders 46, serves to help maintain the base plate 30 in continuous contact with the ground over a transmission interval, thereby to avoid the generation of spurious impact signals.

It is especially desirable to use this supplemental loading from the cylinders 46 in situations where the resonant frequency, as determined by the mass of the base plate assembly 28 and the stiffness of the ground, falls within the transmitted force pulse spectrum. The use of the cylinders 46 is however optional especially where the bias force applied through the cylinder 40 is sufficient to enable intimate contact of the base plate 30 with the ground to be maintained.

The force pulse generator 16 is controlled electrically by signals generated by a control signal generator within the cab 12. This control signal generator is connected to an electro-hydraulic control unit 50 (see FIG. 2) by way of a cable 52. This control unit 50 may comprise control valve and power stages, presently preferred forms of which will be described hereinafter in connection with FIGS. 24 through 29.

The control generator in the cab 10 may receive further control signals from a radio receiver coupled by way of an antenna 54 to a master transmitter. In this way a plurality of mobile units such as illustrated in FIG. 1 can work in synchronism, all being controlled as slaves from a master clock which provides master control signals.

FIG. 2 shows the force pulse generator 16 and its associated apparatus in greater detail. A cylindrical housing 56 has a step bore 58 in which a hammer 60 can oscillate in a direction axially of the housing 56. The hammer 60 has a mass $M_H$ which is driven to produce an impact event during each cycle of its oscillation. From this impact event the force pulse is generated.

The hammer 60 has a piston portion 62. It also has end sections 64 and 66 which slide in bearing sections 68 and 70. These bearing sections 68 and 70 are on opposite sides of a cavity 72 formed by the step bore 58. This cavity is divided by the piston 62 into two parts 74 and 76 on opposite sides of the piston 62.

Pressurized hydraulic fluid is fed into the cavities 74 and 76 from the control unit 50 which is connected thereto via ports 78 and 80. The pressure in the cavities 74 and 76 is switched between supply and return by means of valves in the unit 50 to effectuate the cyclical movement or oscillation of the hammer 60. The time history of the motion of the hammer 60 in relation to the electrical signals which control this hammer motion and the resultant force pulses are illustrated hereinafter in FIG. 25. This motion history is also shown in FIG. 26 which illustrates that the repetition frequency and the amplitude of the hammer motion may be controlled for the purpose of providing the hammer motion may be controlled for the purpose of providing predetermined sequences of force pulses having predetermined amplitudes in the sequence. It will be noted that the hammer 60 displacement $X_H$ as shown in FIGS. 25 and 26 undergoes an abrupt change of velocity corresponding to the impact events. It is at the times when this abrupt change of velocity occurs that the force pulses are initiated.

These force pulses are generated when the lower end of the hammer 60 impacts a receiver piston 82 in the base plate assembly 28. The cylinder 32 of the assembly 28 is hollow by virtue of a bore 84. A threaded section 86 of the bore has a plug 88 secured thereto. This plug has a conical upper end 90 and an axial opening in which the receiver piston 82 is slidably disposed. A cavity 92 is formed in the bore 84 between the base plate 30 and the lower end of the plug 88. This cavity is filled with liquid, suitably hydraulic oil. A flange 94 at the lower end of the receiver piston 82 is in contact with the liquid in the cavity 92. The arrangement of confined liquid and the receiver piston 82 constitutes a liquid impact spring. While a liquid impact spring is preferred, other impact springs, which are capable of supporting the impact forces and having the requisite spring rate and mass, may be used. Reference may be had to U.S. Pat. Nos. 3,382,932, and 3,570,609 for general information respecting design of impact springs.

Suitable seals, such as the "O" ring seals 98, 100 and 102, may be used throughout so as to limit the escape of fluid from the cavities 92, 74 and 76.

The operation of the liquid spring in absorbing impact energy imparted to the receiver piston 82 to provide a shaped force pulse which is transmitted to the base plate assembly 28 to the ground is described in detail hereinafter.

The control unit 50 is fed by supply and return lines 104 and 106 from the hydraulic power supply 22 (FIG. 1). These lines may be extensions of the flexible hoses 24 and 25 also shown in FIG. 1. Supply and return accumulators 108 and 110 are closely coupled to the supply and return lines 104 and 106 respectively (see also FIG. 27). The control unit 50 receives an electrical input signal indicated as $e_V$ from a timing signal generator 112 which is part of the control generator, which was discussed above as being located in the cab of the vehicle 10 (FIG. 1). This signal $e_V$ controls the valving action which in turn controls the cycle of oscillation of the hammer 60 so as to enable the repetition frequency and amplitude (energy) of the impact event and the resulting force pulses to be predetermined. The repetition frequency and energy is dictated by external input signals $e_R$ and $e_B$ which are applied to the timing signal generator 112. The signal $e_R$ is a pulse signal which times the occurrence of the impact events, and thus the repetition frequency of the force pulses. The signal $e_B$ is a level which sets the amplitude (energy) of the force pulses. Thus by varying or sweeping the repetition frequency of the $e_R$ pulses, the force pulse repetition frequency may be varied while simultaneously varying or maintaining constant the amplitude of the force pulses through the control of the $e_B$ level. The variations in the force pulse repetition frequency and amplitude are predetermined in accordance with this invention to provide a transmitted energy spectrum constrained to the range of frequencies which is both necessary and desirable for use in seismic exploration.

The timing signal generator 112 may also include, as may be observed from FIG. 24, a parameter generator which receives information respecting the various parameters affecting the oscillation cycle of the hammer 60 in the pulse generator 16. These parameters are the displacement of the hammer $X_H$ and the supply and return pressures $P_S$ and $P_R$. The pressures are obtained from pressure sensor transducers 114 and 116 attached to the supply and return lines 104 and 106. A displacement sensor 118 is mounted in the bore 58, above the upper end 64 of the hammer 60. This displacement sensor is suitably a differential transformer consisting of a coil 120 and a magnet 122. The magnet 122 is attached to the upper end 64 of the piston 60, such that the signal from the coil 120 which is inputted to the parameter generator of the timing signal generator 112 is proportional to the displacement of the hammer.

During operation, a downward bias is applied to the housing 56 from the cylinder 40 by way of a shaft 124 which is attached to the top of the housing 56. This bias which may be referred to as a "downcrowd" is applied to the base plate assembly 28 by way of the conical surface 90 at the upper end of the plug 88. The lower end 126 of the housing 56 is of a conical shape so as to provide a conical interface. Alignment is provided by the bore 84 at the upper end of the base plate assembly cylinder 32 which receives the lower end 126 of the housing 56. Pins 128 in the housing 56 pass through clearance slots 130 in the cylinder 32. During operation the pins 128 do not contact the walls of the slots 130. However, when the pulse generator housing 56 is raised by means of the cylinder 40 (FIG. 1) the pins 128 engage the upper wall of the slots 130 to enable the base plate assembly to be raised with the pulse generator housing 56 and transported by the carrier 10 (FIG. 1).

Figure 3:
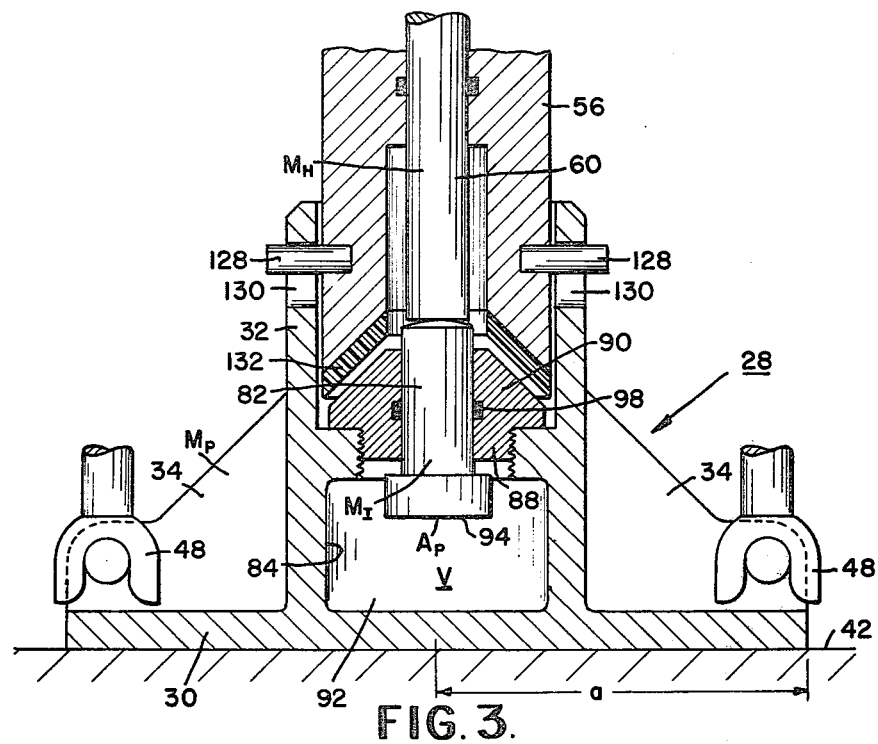
FIG. 3 is an enlarged, fragmentary, sectional view of the coupling plate and force-pulse shaping system employed in the apparatus shown in FIG. 2 but illustrating the position of the parts following impact.

A conical member 132 is attached to the bottom of the housing end 126. The member 132 is suitably of damping material such as a sandwich structure of aluminum and phenolic resin plastic (e.g. "MICARTA"). Accordingly, when the downcrowd is applied to the generator housing 56, the upper end or impact surface 134 is aligned with the bottom of the hammer when the conical member 132 is seated on the conical surface 90. Following impact as shown in FIG. 3, the base plate assembly 28 is driven away from the generator housing 56, and the surface of the conical damping member 132 separates from the conical surface 90 of the plug 88. The damping material member 132 cushions the dynamic contact after each impact which occurs when the downcrowd force applied to the generator housing 56 again seats the housing 56 on the conical surface 90 of the plug 88. Thus no impulse events are generated beyond those associated with the normal termination of the force pulse.

Consider the generation of impulse like signal energy in the earth from an impact event such as produced by a blow from the hammer directly upon the base plate 30 without the interposition of an impact spring. This process would be inefficient for purposes of geophysical exploration. The impact event would appear as an approximation of a Dirac delta function having a near zero time duration and very large amplitude. The energy spectrum would then be very broad and have a spectral width exceeding the transmission bandwidth generally adapted for geophysical analysis. The energy contained in the impulse spectrum that falls outside of the analysis band is lost, making the process inefficient. It is a feature of this invention to shape the force pulse generated upon the occurrence of an impact event so as to transmit signal energy in a spectrum constrained to the analysis frequency band.

Referring more particularly to FIGS. 2 and 3, it will be observed that the base plate assembly 28 has a radius, a, in contact with the earth. The liquid in the cavity 92 has a volume V which is equal to the volume of the cavity 92. The liquid has a bulk modulus $\rho c^2$. The receiver piston 82 of the liquid spring has a mass $M_I$. The effective surface area of the piston 82 exposed to the liquid volume has an area $A_p$. The hammer 60 has a mass $M_H$.

Figure 5:
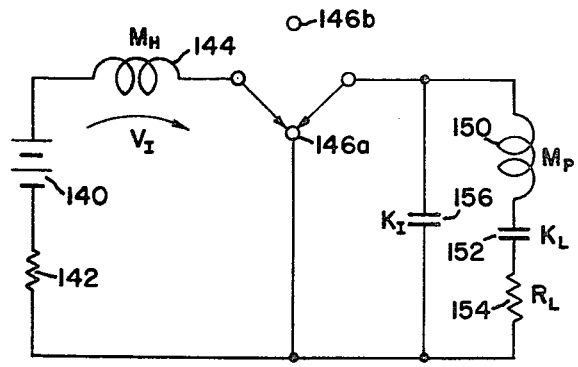
FIG. 5 is an equivalent circuit which models the force pulse generating and shaping apparatus illustrated in FIGS. 1 to 3.

The approximate equivalent circuit of the hammer and liquid spring is illustrated in FIG. 5. A battery 140 and its internal resistance 142 represent the hydraulic driving force exerted on the hammer mass 144. A double pole switch 146 is shown as having two positions. In an initial position 146a, the free velocity $V_I$ is built up in the hammer mass $M_H$. At the moment of impact, the switch 146 is in position 146b enabling the kinetic energy of the hammer to be transferred to the load circuit. The load circuit is constituted approximately by the parallel combination of the stiffness 156 of the liquid impact spring, $K_I$, with the base plate mass $M_P$ and the load parameters $K_L$ and $R_L$. In the circuit representation the mass 150 represents the mass $M_P$ of the base plate assembly 28. The ground presents a stiffness 152 and a resistance 154 to the base plate 30. This stiffness is indicated as being $K_L$ and the resistance is $R_L$.

Consider that the mass of the hammer $M_H$ is much larger than the mass of the receiver piston $M_I$, such that the latter mass can be neglected. Also the mass of the base plate assembly $M_P$ is assumed greater than the mass of the hammer $M_H$. Thus the initial response of the load circuit when the switch 146 is placed in position 146b is that the inertia of the base plate mass $M_P$ keeps the base plate from moving instantaneously, while Kinetic energy of the hammer is transferred to stored potential energy in the impact spring, with a force building up on the base plate at a rate which is a function of the hammer mass and the impact spring rate. The base plate then begins to move forward to transfer the potential energy stored in the impact spring to the load. The rate at which this transfer occurs is a function of the circuit parameters. These parameters are expressed below in equations (1), (2) and (3).

$$K_I = \frac{\rho c^2}{V} A_p^2 \quad (1)$$

$$K_L = \frac{4Ga}{1 - \mu} \quad (2)$$

$$R_L = R_D + \frac{3.4}{1 - \mu} a^2 \sqrt{G \rho_s} \quad (3)$$

In Equation (2) and (3) G is the shear modulus, $\mu$ is Poisson's ratio, and $\rho s$ is the density of the soil in the vicinity of the base plate.

As the hammer 60 reaches the limit of its stroke in the downward direction, energy is stored in the impact spring $K_I$, in the spring rate $K_L$ of the earth, and in any residual kinetic energy of the base plate assembly 28. This stored energy will, in part, be transferred back to the hammer 60, causing it to rebound, and, in part, be dissipated in the load. Approximately, the rebound energy is the difference between the energy imparted to the impact spring-base plate system and the energy delivered to the load $R_L$. The load is made up of a radiation resistance $R_R$ which is the last term in Equation (3) and a local damping resistance $R_D$.

It is a feature of this invention to accept and use the rebound energy such that the hydraulic drive system for the hammer 60 need make up primarily only the energy loss that was transmitted to the load $R_L$ on the previous impact.

Equation (3) shows that the radiation resistance $R_R$ portion of $R_L$ is proportional to the area of the base plate 30. Generally the ratio of $R_L$ to $R_D$ increases with increasing base plate radius. In order to increase the portion of dissipated energy that appears as radiation relative to that that appears as local damping, it is generally desirable that the base plate 30 have a large cross sectional area.

It is a feature of this invention, which arises out of the use of the impact spring, to enable the base plate to have such large cross section. Base plates used in accordance with the prior impact producing techniques have generally been small compared to those used in vibratory signal generators (e.g., Vibroseis). This has been done in order to keep the base plate light in weight, thereby to reduce the impact stresses therein, and to avoid impeding the transfer of the blow energy to the earth. The impact spring provided in accordance with the invention absorbs the blow force and distributes this force over the base plate 28 without giving rise to trapped stresses and other deleterious effects which might cause damage to the base plate and/or the hammer. The temporal distribution of the force (viz., the tailoring or shaping of the impulse with time, which is accomplished using the impact spring) optimizes the energy transfer and places it within the desired analysis bandwidth. Accordingly, the signal strength transmitted is increased, damage to the base plate and the hammer is avoided, and efficient utilization of the generated energy is obtained, through the use of the impact spring.

Consider now how the impact spring arrangement provides for optimization of energy transfer within the desired analysis bandwidth. Take the band width to be a band of frequencies extending from a low frequency of $f_1$ to a high frequency of $f_2$.

For purposes of example, let the base plate 28 radius, $\gamma_o$, be two feet and the base plate mass, $M_P$, be 2400 pounds, which is a conservative value. Typical values of the density, $\rho$, shear modulus, G, and Poisson's ratio, $\mu$, of the earth are given below:

$$G = 5340 \text{ lbs/in}^2$$

$$\rho = 2.1 \times 10^{-3} \text{ lbs/in}^3$$

$$\mu = \tfrac{1}{3}$$

Using these values and Equations (2) and (3), the stiffness and resistance presented by the ground to the 4 foot diameter baseplate are $$\left. \begin{array}{l} R_L = 10{,}000 \text{ lb sec/in} \\ K_L = 777{,}000 \text{ lbs/in} \end{array} \right\} \quad (4)$$

Consider the case where the upper frequency of analysis, $f_2$, is 75 Hz. At this frequency, the stiffness reactance of the ground is $$X_{GS} = \frac{K_L}{\omega_2} = \frac{777{,}000}{2 \pi 75} = 1650 \text{ lb sec/in} \quad (5)$$

and the mass reactance of the base plate is $$X_{PM} = \omega_2 M_P = 2 \pi 75 \frac{2400}{386} = 2930 \text{ lb sec/in} \quad (6)$$

Figure 5A:
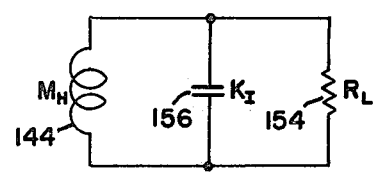
FIG. 5A is a simplified form of the circuit shown in FIG. 5.

In the vicinity of $f_2$ the ground resistance predominates over the ground stiffness reactance or the base plate mass reactance. In the vicinity of $f_2$, it is possible, therefore, to simplify the equivalent circuit of FIG. 5 to that illustrated in FIG. 5A, valid during the contact duration of the hammer mass $M_H$ with the impact spring.

This contact duration, $T_P$, is approximately $$T_P = \frac{1}{2f_p} = \pi \left(\frac{K_I}{M_H}\right)^{-\frac{1}{2}} \quad (7)$$

where $f_p$ is the parallel resonant frequency of the hammer mass $M_H$ with the impact spring stiffness $K_I$. The shape of the resulting force pulse will be approximately that of a half sinusoid, with the hammer lifting off the spring as hammer acceleration becomes positive upward.

Figure 6:
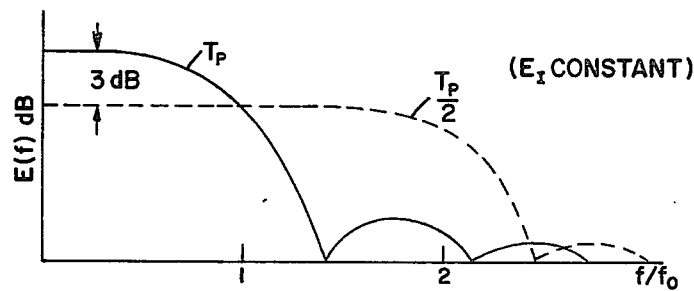
FIG. 6 is a diagram illustrating the spectrum of two force pulses having the same energy but different time durations.

For a half sinusoid force pulse the corresponding energy spectrum is that illustrated by the solid curve in FIG. 6.

The frequency, $f_o$, for which the spectral level E(f) is reduced 3 dB below that of the low frequency asymptote is approximately $$f_o = 0.6 \frac{1}{T_p} \quad (8)$$

$$f_o = \frac{0.6}{\pi} \sqrt{\frac{K_I}{M_H}}$$

It may be noted (see FIG. 6) that more than 80% of the energy in the force pulse is confined to the frequency range below $f_0$. Thus, the frequency $f_0$, which is intimately tied to impact spring stiffness-hammer mass ratio, can be equated to the frequency, $f_2$, which is the upper frequency of the analysis band. The force pulse is thus tailored to place the majority of the energy of the impact blow below the upper frequency of the analysis band, leading to an efficient process. At the same time, the broadened force pulse reduces stresses in the hammer and base plate, confining such stresses to the levels required for adequate signal energy transmission.

The lower frequency $f_1$ of the analysis band is set by the condition that the stiffness reactance of the ground begins to exceed the resistance associated with radiation loading. Approximately, then from Equation (2), (3) and (4)

$$f_1 = \frac{1}{2\pi} \frac{K_L}{R_L} \quad (9)$$

$$f_1 = \frac{1}{2\pi} \frac{4}{3.4} \frac{G}{\gamma_o} \sqrt{\rho c} = 12.4 \text{ Hz}$$

Thus, in this example, between approximately $f_1 = 12$ Hz and $f_2 = 25$ Hz the energy spectrum is essentially flat, with $f_1$ and $f_2$ being the $-3$ dB points. Useful energy below $f_1$ may exist, however, for exploration purposes, since the slope of transmitted energy fall-off is modest, and the attenuation of energy within the ground reduces with reducing frequency. A more definitive limitation on $f_1$ may be the lowest repetition frequency of a force pulse sequence as will be described hereinafter.

For the example given above, the resonant frequency of the base plate mass with the ground stiffness is $$f_B = \frac{1}{2\pi} \sqrt{\frac{K_L}{M_P}} = \frac{1}{2\pi} \sqrt{\frac{777,000 \times 386}{2400}} = 56 \text{ Hz} \quad (10)$$

which falls within the chosen analysis band. However, at this frequency the resonant Q of the series load circuit is given by $$Q_s = \frac{\omega_B M_P}{R_L} \quad (11)$$

or $$Q_s = \frac{2 \times \pi \times 56 \times 2400}{10,000 \times 386} = 0.22$$

For this case, then, the resonant load is highly damped and its inherent resonant character can be ignored. The selection of appropriate values for the hammer mass $M_H$ and impact spring stiffness $K_I$ will result in a parallel resonant circuit $Q_p$ ($Q_p = R_L/\omega_B M_H$) for the circuit of FIG. 5A having values generally in excess of $2\pi$. With such values the assumed half-sinusoid character of the force pulse can be achieved.

The values for the ground parameters used above are typical, yet subject to substantial variation from location to location. Their variations will, however, have little, if any, effect upon the upper frequency, $f_2$, which is largely determined by $M_H$ and $K_I$. They may, however, have more effect upon the lower frequency, $f_1$. From Equation (9), it can be seen that when extension of analysis bandwidth to lower frequencies is desired, base plates of large radius are desirably used.

The spectrum level E(f) as shown in FIG. 6 is proportional to the time duration of the force pulse $T_P$, and the peak value of this force pulse $F_P$. Specifically $$E(f) \sim (\hat{F}_P T_P)^2 \quad (12)$$

The energy in an impulse event $E_I$ is proportional to the square of the peak force and the duration of the force or $$E_I \simeq \hat{F}_P{}^2 (T_P) \quad (13)$$

From the relationships as set forth in Equations (11) and (12) it can be seen that if the energy of the impulse event is held constant while the duration is halved, the spectrum level will reduce by a factor of 2, or by 3dB. This is shown in FIG. 6, where for the half pulse width case, $T_P/2$, the spectral width has doubled and the spectrum level has halved.

Figure 7:
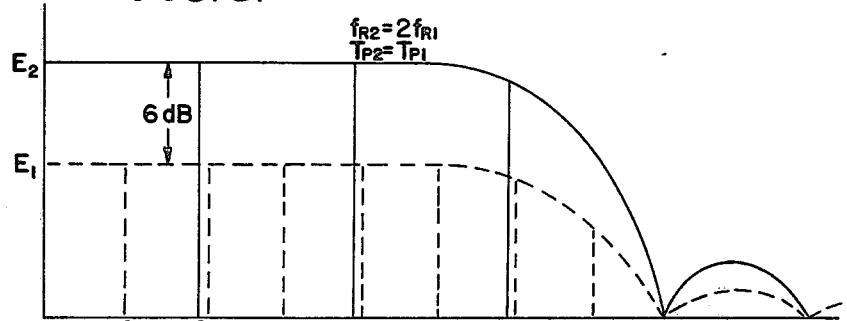
FIG. 7 is a diagram illustrating the spectrum of two repetitive force pulse trains.

FIG. 7 shows the spectrum resulting from the repeated application of the force pulses at a constant repetition frequency $f_R$. The period or time interval $T_R$ between force pulses (see FIG. 4) is then equal for the entire force pulse train. Instead of a continuous spectrum extending to the cutoff frequency $f_0$ as shown in FIG. 6, the spectrum is broken up into a series of line components spaced apart a distance $f_R$ and confined to an envelope as shown in FIG. 6 which is determined by the shape of the individual force pulse, and which establishes the envelope of the spectrum of the sequence of force pulse events.

For a given energy per impulse, the line levels for repetitive impulses are proportional to the repetition frequency. The solid line envelope in FIG. 7 illustrates the case where the fundamental repetition frequency $f_{R2}$ is twice the repetition frequency $f_{R1}$ shown by the case illustrated by the dash line envelope. Since there are half as many lines within the envelope where the repetition frequency is $f_{R2}$ and since there are twice as many impulses per unit time, the individual line levels for $f_{R2}$ are 6 dB higher than those for $f_{R1}$. Since the pulse width $T_P$ is identical for both cases, the envelope and the cutoff frequencies are the same, except for the 6 dB difference in spectrum level.

The repetitive spectrum would not be particularly useful for resolution of reflecting surfaces in geophysical exploration, since any given reflector will be observed as series of reflectors of equal strength spaced in time $T_R$ apart. Past impact producing techniques have utilized repetitive events but with sufficient spacing in time such that all acoustic reflection from a given force pulse can be recorded before the next pulse occurs. These techniques are, however, time consuming and usually require many repetitions at many locations before an adequate signal to noise ratio is obtained (viz., survey time is quite prolonged). While the methods and apparatus for providing shaped force pulses will afford substantial improvements if applied to such impact producing techniques as have been used for seismic exploration heretofore, substantial improvements can be obtained by providing sequences of shaped force pulses having predetermined formats as will be described hereinafter in connection with FIGS. 8 though 23A.

Returning now to FIGS. 2, 3, 25 and 26, the manner in which the pulse generator system serves to generate the shaped force pulses individually and in sequences of pulses having predetermined repetition frequencies and amplitudes will now be discussed in greater detail.

The time history of motion of the hammer 60 is illustrated in FIGS. 25 and 26. FIG. 25(a) shows the time history of the hydraulic force $F_D$ applied to the piston 62; FIG. 25(b) shows the resulting hammer motion and FIG. 25(c) shows the relative timing of the impact events. With reference first to FIG. 25(b), which shows one cycle of piston hammer displacement, the zero ordinate corresponds to the hammer 60 in initial contact with the receiver piston 82. Displacement in the negative-X direction corresponds to driving the receiver piston 82 into the liquid volume of the cavity 92, as shown in FIG. 3, and to displacement of the baseplate 30 away from the housing 56. The force of the baseplate against the ground is illustrated in FIG. 25(c). Displacement of the hammer 60 in FIG. 25(b), in the plus-X direction corresponds to motion of the hammer away from the impact position.

Impact of the hammer 60 on the receiver piston 82 occurs at time $T_0$. Following initial contact, the hammer 60 displaces negatively, following the receiver piston 82, only to rebound as the potential energy stored in the impact spring is partially returned to the hammer 60. Thus in rebound the hammer 60 returns toward the zero ordinate line. At a time, $T_{S0}$, after the hammer reaches zero velocity and has transferred its kinetic energy to the impact spring-load system, the hydraulic force on the hammer (see FIG. 25(a)) switches directions, thereby accelerating the hammer away from the impact position. This switching time $T_{S0}$ is desirably near the natural zero axis crossing for piston displacement under rebound alone to avoid any reduction in the pulse energy transferred by the preceding event.

The combination of the rebound velocity and the upward force enables the hammer 60 to move away from impact at an ever increasing velocity. When the hammer 60 reaches a prescribed velocity (sensed by the displacement sensor 118) the hydraulic force $F_D$ on the hammer 60 is switched to the opposite direction (see FIG. 25(a)), thereby initiating a deceleration of the piston motion. This switching time is designated $T_{S1}$ in FIG. 25(b). The hammer 60 then decelerates and finally comes to zero velocity at $T_{S2}$ at a height shown as $X_S$ in FIG. 25(b). The hammer 60 may be held at position $X_S$ for an arbitrary time with zero force applied. At a subsequent switching time $T_{S3}$ a positive hydraulic force is again applied, and the hammer accelerates toward the load, impacting the receiver piston 82 at time $T_0'$. The holding times and switching times are predetermined in accordance with the control signals $e_R$ and $e_B$ by means of the systems to be described hereinafter in connection with FIGS. 24 and 24A.

The kinetic energy of the hammer 60 at impact is equal to the potential energy it held at position $X_S$. Thus, $$F_D X_S = (\tfrac{1}{2}) M_H V_I^2 \tag{14}$$

where, $F_D$ is the hydraulic force on the hammer 60 in the downward direction (assumed constant over the hammer downstroke) and $V_I$ is the impact velocity.

A portion of the kinetic energy of the hammer 60 is transferred to the load while another portion appears as rebound velocity $V_R$, which is indicated as the slope of the hammer's time history curve (FIG. 25(b)), at time $T_{S0}$.

As previously noted, at or near time $T_{S0}$ the hydraulic force $F_D$ changes sign to drive the hammer 60 upward. The switching time $T_{S1}$ at which the force $F_D$ again changes sign, to enable the piston to reach position $X_S$ and zero velocity simultaneously, can be shown to be $$T_{S1} = -\frac{M_H}{F_D} V_R + \sqrt{\frac{M_H X_S}{F_D}} \left[ 1 + \frac{M_H V_R^2}{F_D X_S} \right]^{\tfrac{1}{2}} \tag{15}$$

The time that the hammer 10 then takes to reach $X_S$ is $$T_{S2} - T_{S1} = T_{S1} + \frac{M_H}{F_D} V_R \tag{16}$$

The time delay between the switching time $T_{S3}$ and the subsequent impact event at time $T_0'$ becomes $$T_0 - T_{S3} = \sqrt{\frac{2 M_H X_S}{F_D}} \tag{17}$$

The total period, $T_R$, in the absence of any delay between $T_{S2}$ and $T_{S3}$, is $$T_R = T_0' - T_0 = -\frac{M_H}{F_D} V_R + 2\sqrt{\frac{M_H X_S}{F_D}} \left\{ \frac{1}{\sqrt{2}} + \left[ 1 + \frac{M_H V_R^2}{F_D X_S} \right]^{\tfrac{1}{2}} \right\} \tag{18}$$

If $V_R$ is zero, the maximum repetition frequency becomes $$f_{R(MAX)} = \frac{1}{T_R} = 0.292 \sqrt{\frac{F_D}{M_H X_S}} \tag{19}$$

For a given blow energy, the repetition frequency can thus vary, as a function of the delay time $T_{S3} - T_{S2}$, from any value between zero and that given by Equation (19) (for $V_R = 0$).

This changing repetition rate as a function of delay time $T_{S3} - T_{S2}$ is shown in FIG. 26. FIG. 26(a) shows a varying repetition frequency with $X_S$ held constant (constant blow energy). FIG. 26(b) shows the varying frequency coupled with changing $X_S$. When the product $E_B \cdot f_R$ is held constant, constant power output results.

In order to provide high resolution and high signal to noise in the transmission of the force pulses described above, it has been found, in accordance with the invention that such force pulses should be transmitted in non-repetitive or aperiodic sequences. Such sequences may also be considered to be code formats. These sequences or formats may be transmitted over a short transmission interval which also leads to increasing the speed of seismic surveying.

For purposes of illustration, the following presently preferred sequences or formats will be hereinafter discussed:

1. Linear frequency modulation of the force pulse repetition frequency.
2. Non-linear frequency modulation, such as logarithmic modulation, of the force pulse repetition frequency.
3. Linear period modulation of the force pulse repetition period.
4. Double modulation sweeps which synthesize lower frequency sweeps using pulses swept over a band of higher frequencies.

The above mentioned sequences or formats can, in accordance with the invention, be carried out with each individual force pulse containing the same energy (in terms of the force amplitude), or the energy can be varied in accordance with the repetition frequency. Such variation in energy may be used to provide for constant power output over a transmission interval or falling power output over the transmission interval. The latter case of falling power output may be especially suitable for use when it is desired to match the power transfer characteristics of a power supply which drives the pulse generator (viz., 16, FIG. 1) such as a hydraulic power supply which stores energy in accumulators.

Variations in the energy of the force pulses during the transmission interval may also be used to control the level or slope with respect to frequency of the force pulse spectrum. In this manner the spectrum level in the fundamental band (by which is meant the lowest full octave of repetition frequency variations) may be maintained essentially constant. Variation in the force pulse energy over the transmission interval may also be used to minimize discontinuities at the joints between the fundamental and the second harmonic bands or panels or between higher harmonic bands or panels which result from the different sweep rates of such bands or panels. The second harmonic of a fundamental repetition frequency will sweep at twice the rate of the fundamental sweep; the third harmonic will sweep at three times the rate of the fundamental sweep and so forth. The spectrum level of the second harmonic will be down 3 dB from the fundamental at any corresponding point, the third harmonic will be down 5 dB, and so forth.

For a sweep of the fundamental frequency of one octave, a joint occurs at the point where the ending fundamental joins the second harmonic of the beginning fundamental. The magnitude of the discontinuity at this joint will depend upon the type of sweep employed. At the point where the second and third harmonic panels overlap, rapid oscillations of the spectrum level commence due to successive constructive and destructive interferences. This interference appears as "grass" in the diagrams, illustrating the spectrum (see for example FIG. 10). The envelope shape of the spectrum is controlled by the shape of the force pulses such that the spectral energy is constrained to lie in the analysis band.

It has been found in accordance with the invention that the auto-correlation function of the transmission, which function is a measure of resolution, is sensitive principally to the mean spectrum level, particularly for delay times near zero delay, and is relatively insensitive to these rapid interference fluctuations that appear as grass. In accordance with the invention, the slope and joint discontinuities in the spectrum are substantially eliminated so as to obtain a substantially constant mean spectrum level. As a result, the auto-correlation function is improved, particularly for small values of delay time, yielding high resolution and minimum target ambiguity.

Consider now the relationships governing logarithmic frequency modulation and linear period modulation.

Linear frequency modulation is governed by an equation of the form $$f_R(t) = f_0(1 + (t/\tau)) \qquad (20)$$

Logarithmic frequency modulation is governed by an equation of the form $$f_r(t) = f_0 \, 2^{t/\tau} \qquad (21)$$

where $\tau$ is the time taken to sweep one octave in frequency.

Linear period modulation is governed by an equation of the form $$f_R(t) = f_0/1 - t/T \qquad (22)$$

where T is a constant determined by the ending frequency in the sweep.

The energy spectrum level, $E(\omega)$, is of the form $$E(\omega) \sim \frac{T_P^2 \hat{F}_P^2 f_R^2(t)}{\frac{df_R(t)}{dt}} \qquad (23)$$

where $T_P$ is the force pulse length, $\hat{F}_P$ is the force pulse amplitude (see FIG. 4), and $f_R(t)$ is the time dependent repetition frequency as governed by Equations (20), (21) or (22).

Equation (23) can be employed to determine the spectrum slope in the fundamental band for the various sweep types, as well as the dependence of level on force pulse amplitude and force pulse width (see also Equation (12)).

Table 1 is a listing of various types of sweeps of the fundamental repetition frequency, $f_R$, over a base octave band, with associated amplitude functions, and the resultant spectrum slope in the fundamental band, magnitude of first joint discontinuity, and the power characteristic over the sweep duration.

TABLE I

| Sweep Type | Amplitude Function | Spectrum Slope (1st Octave) | Joint Disc. | Power Slope |
|---|---|---|---|---|
| Linear Per. Mod. | Constant | flat | 3 dB | 3 dB |
| Linear Per. Mod. | $f^{-\frac{1}{2}}$ | −3 dB | 0 dB | flat |
| Log FM | $f^{-\frac{1}{2}}$ | −3 dB | 0 dB | −3 dB |
| Log FM | $f^{-\frac{1}{2}}$ | flat | 3 dB | flat |
| Log FM | Constant | 3 dB | 6 dB | 3 dB |
| Linear FM | Constant | 6 dB | 9 dB | 6 dB |

Of the six sequences listed in Table 1, the ones yielding the least side lobe energy relative to the principal lobe are first and fourth listed, which yield the flat spectrum in the fundamental band, yet retain a 3 dB joint discontinuity.

The spectrum can be modified if the sweep of the fundamental repetition rate, $f_R$, is continued beyond the first octave, as will be discussed hereinafter.

For purposes of illustration, consider the example of a shaped force pulse having a repetition frequency swept nominally over the base octave band from 5 to 10 Hz. Such force pulses may be generated using the apparatus described in connection with FIGS. 1 to 3. The sweep is such as to give flat mean spectral energy in the base band and in the individual harmonic bands or panels. As shown in Table 1, either a linear period modulation at constant amplitude, or logarithmic frequency modulation with amplitude varying as $f^{-\frac{1}{2}}$, may be used.

FIG. 10 shows the coherent development of the spectrum, E (f), for the logarithm frequency modulation sweep with amplitude varying as $f^{-\frac{1}{2}}$. The flat base band from 5 to 10 Hz is evident, as is the initiation of the flat 2nd harmonic panel at a reduced level of 3 dB, and the commencing of the interference fluctuations at 15 Hz due to overlap of the second and third harmonic panels. Shown also in FIG. 10 is the autocorrelation function $\rho(\tau)$ for this swept transmission.

The harmonic panel summation may be better understood by considering such summation as if done incoherently, without the rapid interference fluctuations present.

FIG. 8 shows the development of the first twelve harmonic panels of the base band sweep. As the fundamental sweeps from 5 to 10 Hz, the second harmonic sweeps from 10 to 20 Hz at twice the rate. In any given frequency bin within the sweep range, the second harmonic will contribute only half the energy that the fundamental contributes in moving at half the rate of the second harmonic. Therefore, the spectrum level of the second harmonic panel is $\frac{1}{2}$ (or 3 dB less than) the fundamental panel level. Similarly, the third harmonic sweeps from 15 to 30 Hz at three times the rate of the fundamental sweep. Accordingly, the spectrum level of the third harmonic panel is $\frac{1}{3}$ (or 5 dB less than) the fundamental panel level. The energy spectrum level $E_n$ of the nth harmonic panel is given by $$E_n = (1/n) E_1 \qquad (24)$$

where $E_1$ is the level of the fundamental panel.

Figure 9:
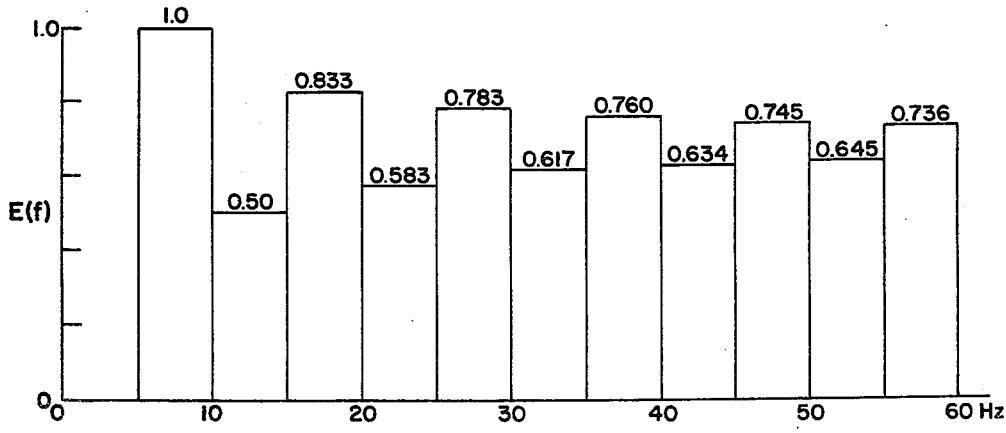
FIG. 9 is a diagram illustrating the energy spectrum which results from summation of the panels shown in FIG. 8.

The incoherent sum of the contributions of the various panels provides the result shown in FIG. 9. FIG. 9 starts off with a 3 dB fluctuation between the first and beginning second harmonic contribution and then tends to oscillate with monotonically decreasing fluctuations about an ultimate level of approximately $0.7\ E_1$.

The fluctuations in FIG. 9 are fluctuations of the mean spectrum level. The mean level fluctuations can be reduced by the addition of energy in selected bands.

FIG. 11 shows a transmission sweep from 10 to 15 Hz with a spectrum level in the fundamental band of $\frac{1}{2} E_1$. When this transmission is added incoherently to that of FIG. 9, the partially smoothed spectrum of FIG. 12 results.

FIGS. 13 and 14 show the further incoherent addition of a transmission extending from 15 Hz to 25 Hz at a level of $1/6 E_1$, in the fundamental band. The summed spectrum in this case has mean fluctuations in the 5 to 60 Hz band not exceeding 0.6 dB.

The three transmissions of FIGS. 8, 11 and 13 can be made at separate times and summed, or they can follow one after another as one integrated transmission.

Consider now in more detail the integrated log FM sweep example. The equation governing the variation of repetition frequency with time for the logarithmic sweep is given in Equation (21). As previously noted, the flat-topped panels occur with this logarithmic sweep when the force pulse amplitude varies with $f_R^{-\frac{1}{2}}$. To change the spectrum level for the second and third intermediate bands, the sweep rate is altered. Thus, for the second intermediate panel where the spectrum level is reduced by a factor of 2, the value of $\tau$ (the time to sweep an octave) will be one-half that used in the first band. Similarly, for the third intermediate panel where the spectrum level is reduced by a factor of six the value of $\tau$ will be one-sixth that used in the first band.

The times over which the intermediate bands are swept are obtained from Equation (21) by taking the logarithm of both sides, as follows $$t = \tau \frac{\ln f_R/f_o}{\ln 2} \qquad (25)$$

From Equation (25), the sweep time $T_1$ to cover the first octave from 5 to 10 Hz is $$T_1 = \tau_1, \qquad (26)$$

by definition.

Since $\tau_2 = \tau_1 = \frac{1}{2} T_1$, $$T_2 = \frac{1}{2} T_1 \left( \frac{\ln f_r/f_o}{\ln 2} \right)$$

or $$T_2 = 0.293\ T_1 \qquad (27)$$

Also, $\tau_3 = \frac{1}{6} \tau_1 = \frac{1}{6} T_1$, and $$T_3 = \frac{1}{6} T_1 \left( \frac{\ln 25/15}{\ln 2} \right)$$

or $$T_3 = 0.1229\ T_1 \qquad (28)$$

Now, take for example the total integrated transmission duration T as being 15 sec., $$T = T_1 + T_2 + T_3 = 15 \text{ sec}$$
$$= 1.416\ T_1 \qquad (29)$$

Thus, $T_1 = 10.6$ sec
$T_2 = 3.1$ sec
$T_3 = 1.3$ sec

-continued $$T = 15 \text{ sec} \quad (30)$$

Table 2 which follows, summarizes the beginning and ending times for each of the intermediate sweep and the beginning and ending force pulse amplitudes.

TABLE 2

| Frequency Range | Relative Force Pulse Amplitude | | Sweep Time |
|---|---|---|---|
| | Beginning | Ending | |
| $5 \leq f_R < 10$ Hz | 1 | 0.707 | 0 – 10.6 sec |
| $10 \leq f_R < 15$ Hz | 0.707 | 0.577 | 10.6 – 13.7 sec |
| $15 \leq f_R \leq 25$ Hz | 0.577 | 0.447 | 13.7 – 15 sec |

FIG. 10 shows the spectrum and autocorrelation function for the first intermediate band, from 5 to 10 Hz. FIG. 15 shows the spectrum and autocorrelation functions for the first and second intermediate bands, with the fundamental repetition frequency sweeping from 5 to 15 Hz. FIG. 16 shows the composite spectrum and autocorrelation function for all three bands combined, extending from 5 to 25 Hz, in one integrated sweep of 15 seconds duration. The improvement in the autocorrelation function quality, particularly for small delay times, as the mean spectrum is successively smoothed, is evident by comparing FIGS. 10, 15 and 16.

With an exemplary force pulse width $T_p$ of 8 ms, the envelope of the spectrum begins to roll off around 75 Hz and has a minimum around 250 Hz.

For this logarithmic frequency modulated sweep with force pulse amplitude varying as $f^{-\frac{1}{2}}$, the power output has previously been shown to be constant over the entire sweep duration, thereby enabling a driving power supply to be loaded to its maximum capacity over the full sweep duration.

In addition to the example illustrated in connection with FIGS. 8–14 of logarithmic frequency modulation (Log FM) with force pulse amplitude varying as $f^{-\frac{1}{2}}$, consider another example where also the mean level of the spectrum is smoothed. This occurs with linear period modulation with constant force pulse amplitude over each intermediate band. Time durations for the sweep are, for purposes of the illustration, set at 15 seconds. The repetition frequency $f_R$ is swept within this total time over three intermediate bands, first, from 5 Hz to 10 Hz at level $E_1$; second, from 10 Hz to 15 Hz at $\frac{1}{2} E_1$; and finally from 15 Hz to 25 Hz at 1/6 $E_1$. The individual pulse duration $T_P$ are taken for purposes of this illustration as 8 ms.

The governing frequency equation (Equation 22) becomes $$f_R = 93.75/18.75 - t \quad (31)$$

Table 3 sets forth the times for the three intermediate sweeps, based upon Equation (31), and the force pulse amplitudes in each band.

TABLE 3

| Frequency Range | Relative Force Pulse Amplitude | Sweep Time |
|---|---|---|
| $5 \leq f_R < 10$ Hz | 1 | 0 – 9.375 sec |
| $10 \leq f_R < 15$ Hz | 0.707 | 9.375 – 12.5 sec |
| $15 \leq f_R \leq 25$ Hz | 0.408 | 12.5 – 15 sec |

FIG. 17 shows the spectrum and autocorrelation function for the first intermediate band, from 5 to 10 Hz of the linear period sweep.

FIG. 18 shows the spectrum and autocorrelation function for the first and second intermediate bands, with the fundamental repetition frequency sweeping from 5 to 15 Hz.

FIG. 19 shows the composite spectrum and autocorrelation function for all three bands combined of the linear period sweep, extending from 5 to 25 Hz, in one integrated sweep of 15 seconds duration.

Comparing FIGS. 10, 15, and 16 with FIGS. 17, 18, and 19, a great similarity is seen to exist between the resultant spectra and autocorrelation functions for the two sweep types. In both instances the spectrum smoothing and improvement in the autocorrelation function from the summation of the first two intermediate bands is accomplished. In FIGS. 16 and 21 further improvement from the addition of the third band is less noticeable, but is still significant.

FIG. 20 shows the relative power in the two transmissions over the sweep. The linear period modulation has a power requirement that varies by about ± 3 dB over the sweep. The frequency modulated sweep is, as above noted, characterized by a constant power requirement. If the force pulse amplitudes are matched for the two sweep types at time t = O, the total energy in the linear period sweep is about 30% more than the total energy in the logarithmic frequency sweep.

FIG. 16 and 19, representing the composite smoothed sweep for the logarithmic frequency and linear period cases, respectively, exhibit autocorrelation functions with negligible ringing of the side lobes. This desirable property occurs because of the natural taper to the spectrum due to force pulse shaping. FIG. 21, shows, for comparison, a conventional "box car Vibroseis" type linear frequency, analog sine-wave sweep of 15 seconds duration over the 5–75 Hz band which is the band essentially covered by the two examples above discussed. Gibbs phenomenon is evident at the ends of the sweep and is reflected in the high fequency ringing on the corresponding autocorrelation function. Although a cosine-squared taper can be applied to the analog sine-wave sweep to reduce the ringing, it is seen that the autocorrelation functions of FIGS. 16 and 19 are in every respect competitive with or better than those provided by the linear-frequency analog sine wave sweep. The corresponding shaped-force pulse transmission can, however, be more efficiently generated and can be more effectively coupled to earth formations, as noted above:

The formats used as examples to develop the results shown in FIGS. 16 and 19 are exemplary of other formats which can be provided in accordance with the invention. A further example of another format which provides similar spectral and autocorrelation properties, but which exhibits different power requirements over the sweep, is a linear period modulation in which force pulse amplitude is held constant over the total sweep while the sweep rate is changed for each intermediate band. For the linear period modulation sweep as given by Equation (20), the sweep rate is given by $$\frac{df}{dt} = \frac{f_o}{T} \frac{1}{\left(1 - \frac{t}{T}\right)^2} \quad (32)$$

In this case a new value of T should be selected for each intermediate band so that the requisite band levels, as governed by Equation (23), are achieved.

This constant force-pulse amplitude case is characterized as one that enables the force pulse generator (e.g., 16, FIGS. 1-3) to be stressed to its maximum safe level continuously over the sweep, producing maximum available energy per pulse, thereby providing the maximum total energy in a given time or a given total energy in the least time for the given pulse train. From a power supply viewpoint this latter case requires a five-fold change in power demand over the 5 to 25 Hz repetition rate band, or a three-fold change in power demand over the more restricted 5-15 Hz band in the previously described examples, making energy storage power supplies desirable.

The above described exemplary formats or sequences provide a spectrum width extending from 5 Hz to about 75 Hz, although the impulse sequence repetition rate sweeps over a much smaller band from 5 Hz to 25 Hz (or even to only 15 Hz (see FIGS. 15 or 18)).

It may be desirable to generate the force pulses over a higher band (e.g., 20-80 Hz). In accordance with the invention, such a nominally higher frequency sweep may be modulated at a low frequency rate, thereby to synthesize spectral energy at frequences below this nominal higher sweep band. This aspect of the invention provides several advantages; First, over a given sweep duration, the concentration of impulse events at the higher range of repetition sweep rates can enable a higher total number of events to occur, thereby enabling a smaller energy per event for a given total energy output over the sweep. Second, smaller energy per event can be generated by smaller signal generation equipment. Third, the larger number of events can have beneficial effect upon signal-to-noise after reception of the seismic signals in the processing of the received signal.

The double modulation sweep is provided, for example, as a frequency modulation imposed upon a frequency modulation sweep, or a period modulation imposed upon a period modulation sweep. For example, a two octave sweep extending from 20 to 80 Hz can have its sweep rate modulted at a low frequency rate, thereby generating low frequency energy. In particular, if the low frequency rate is, in turn, swept from 5 to 20 Hz, energy is then generated continuously from 5 to 80 Hz. The 20 to 80 Hz sweeps may be repeated at a rate which changes from 5 sweeps per second to 20 sweeps per second.

A format, which is preferred by reason of its simplicity is illustrated in FIG. 22, in which a basic repetition frequency sweep of force pulses which sweep from a repetition frequency of 20 Hz to 80 Hz is modified to exclude alternate pulse pairs. The process acts as a four-fold frequency divider to synthesize a lower frequency sweep of synthetic events having repetition frequencies ranging from 5 Hz to 20 Hz. It may be implemented in the control signal generator (FIG. 24) by logic circuitry consisting of flip-flops and gates which inhibit the alternate pulse pairs in the basic sweep (FIG. 22) which is generated by a variable frequency clock (20-80 Hz).

FIG. 23 shows the energy spectrum and autocorrelation functions of the sweep generated with pulse pairs removed, as shown in FIG. 22. The time duration of the sweep is 15 sec., and the pulse width is 8 ms. The spectrum extends down to 5 Hz as a result of the synthetic low frequency sweep construction.

By a process similar to that explained in connection with the summation of panels shown in FIG. 9, 11, and 13, further smoothing of the mean spectrum of the sweep of FIG. 23 can be achieved to obtain further side lobe reduction in the autocorrelation function.

In the construction of the 20 to 80 Hz sweep, the force pulse amplitude has been taken as 0.707 times the amplitude used for the low frequency (5-25 Hz) sweep shown in FIG. 19. However, the mean spectrum levels are essentially indentical. This occurs since there are essentially twice the number of pulse events (N = 320) in the 20-80 Hz sweep with pulse pairs removed than there are in the 5-25 Hz composite sweep (N = 160) for the exemplary 15 second transmissions. Thus, for approximately the same spectral characteristics, the event energy for the 20-80 Hz can be halved, leading to a smaller, lighter device. Note that the total energy and power ratings for the two signal generators compared can be identical.

Other synthetic sweeps can be generated by more complex schedules for pulse elimination from a basic sweep, and by combining segments where pulse elimination is involved.

While sweeps are illustrated as increasing in repetition frequency over the transmission interval, alternatively the repetition frequency may be scheduled to decrease with time over the transmission interval. It is necessary only to program the variable frequency clock in the control signal generator (FIG. 24) as desired.

If desired, the interference fluctuations (grass) that accompany the overlapping harmonic panels in the spectrum of the swept sequence of impulse events can be eliminated within a frequency band of arbitrary upper limit by insuring that in any one transmission the frequency sweep does not create harmonic panel overlap at any frequency up to the aforementioned arbitrary limit.

Overlap occurs first when, in any one transmission, the nth harmonic of the lowest repetition frequency transmitted, $f_L$, coincides with the $(n-1)^{th}$ harmonic of the highest repetition frequency transmitted, $f_H$. Expressed analytically, overlap occurs when $$nf_L = (n-1)f_H \qquad (33)$$

Equation (33) may be solved for $f_H$, and expressed as follows for the case for avoiding overlap $$f_H \leq n/(n-1) f_L \qquad (34)$$

If relationship (34) is obeyed, then overlap is avoided in any one transmission for all frequences below an upper frequency limit, $f_U$, where $$f_U = nf_L \qquad (35)$$

A series of transmissions can then be define, where the value of $f_L^{(i)}$ for the $i^{th}$ transmission is $f_H^{(i-1)}$ for the immediately preceding or $(i-1)^{th}$ transmission, thereby developing a continuous set of sweeps which extend over at least one octave in extent. In general, n/2 transmissions are required to achieve the octave coverage. As will be seen, transmissions beyond the octave range may be desired for additional spectrum smoothing.

The $i^{th}$ transmission, having repetition frequencies $f_R$, where $f_L^{(i)} \leq f_R \leq f_H^{(i)}$, should be processed separately from its neighbors. This means that reception of all arrivals from the i$^{th}$ transmission must be concluded before the (i + 1)$^{th}$ transmission occurs.

The effective autocorrelation function of the composite set of independent transmissions, properly aligned in time, is then the sum of the autocorrelation functions of the individual transmissions. Since the summation process is done incoherently, the phase interferences that otherwise lead to the rapid fluctuations in the coherent process are eliminated.

The penalty for achieving this improvement in the autocorrelation function is an increase in the total transmission time by $(n/2)T_L$, where $T_L$ is the time between the end of a transmission and the reception of the last arrival from that transmission.

Consider the following example of a non-overlap producing format or sequence, where the bandwidth is 5 to 30 Hz. For this case n = 6, and from the recursion formula of Equation (33), the listing in Table 4 below is obtained. The separate spectral bands of the individual transmissions are illustrated in FIG. 23A along with the composite spectrum. It is to be noted that the band (d) 10-15 Hz and band (e) 15-25 Hz are provided at ½ and 1/6 amplitude respectively to flatten further the spectrum. It is to be noted that none of the harmonic bands within the individual transmissions of FIG. 23A overlap below 30 Hz.

TABLE 4.

5 to 30 HZ BANDS GENERATED BY 5 TRANSMISSIONS (NON-OVERLAPPING)

| Band | $f_U$ (Hz) | $f_L$ (Hz) | n | $f_H$ (Hz) | $\Delta f$ (Hz) | Sweep duration (t) (Sec) |
|---|---|---|---|---|---|---|
| (a) | 30 | 5 | 6 | 6 | 1 | 3.33 |
| (b) | 30 | 6 | 5 | 7.5 | 1.5 | 3.33 |
| (c) | 30 | 7.5 | 4 | 10 | 2.5 | 3.33 |
| (d) | 30 | 10 | 3 | 15 | 5 | 3.33 |
| (e) | | 15 | | 25 | 10 | 2.67 |
| | | | | | Total | 16 sec. |

Employing the same sweep relationship, $f_R = 100/(20-t)$, the sweep times are those developed in the right-hand column of Table 4. Of course, other sweep programs can be used with different sweep times, as required. Note thate with the linear period modulation of repetition rate, the time for each transmission, except the truncated last one, is constant.

TABLE 5.

5 - 60 HZ BANDS GENERATED BY 10 TRANSMISSIONS (NON-OVERLAPPING)

| Band | $f_U$ (Hz) | $f_L$ (Hz) | n | $f_H$ (Hz) | f (Hz) | t (sec) | Ave. Energy (ft lbs) |
|---|---|---|---|---|---|---|---|
| 1 | 60 | 5.00 | 12 | 5.45 | 0.45 | 10 | 104,500 |
| 2 | 60 | 5.45 | 11 | 6.00 | 0.55 | 10 | 114,500 |
| 3 | 60 | 6.00 | 10 | 6.66 | 0.66 | 10 | 126,600 |
| 4 | 60 | 6.66 | 9 | 7.50 | 0.84 | 10 | 141,600 |
| 5 | 60 | 7.50 | 8 | 8.57 | 1.07 | 10 | 160,700 |
| 6 | 60 | 8.57 | 7 | 10.0 | 1.43 | 10 | 185,700 |
| 7 | 60 | 10.0 | 6 | 12.0 | 2.0 | 10* | 110,000 |
| 8 | 60 | 12.0 | 5 | 15.0 | 3.0 | 10* | 135,000 |
| 9 | 60 | 15.0 | 4 | 20.0 | 5.0 | 10* | 58,333 |
| 10 | 60 | 20.0 | 3 | 25. | 5.0 | 6* | 45,000 |

*At reduced energy

Table 5 is presented for non-overlapping bands running from 5 to 60 Hz. The basic octave sweep from 5 to 10 Hz takes 6 transmissions, while 4 additional transmissions are used over the 10 to 25 Hz repetition range for spectral smoothing. These last four transmissions are at reduced spectrum level, transmissions 6 and 8 being at ½ level, and 9 and 10 at 1/6 level. For a linear period modulation (LPM) sweep, these reduced level transmissions can be achieved by using the same time durations as for transmissions 1-6, but at reduced time duration employed.

Using a linear period modulation of the form $$f_R = 600 \ 1/120-t \tag{36}$$

each transmission is nominally 10 seconds in duration, except that the last 4 may be truncated as above noted.

The composite spectrum will be similar to that depicted in FIG. 14.

The power variation over the first eight sweeps of Table 5 is about 2 to 1. The sweep with the least power is sweep over band 9 whose mean level is about ⅓ that of sweep 6. This power variation may be accomplished by a power supply using accumulator energy storage. Alternatively a different sweep form may be used, such as a logarithmic frequency modulation with amplitude varying as $f^{-\frac{1}{2}}$. In this event, each transmission is maintained at constant power, but the transmission time will be different for each sweep.

An additional feature arising out of the use of sequences of force pulses in accordance with the invention is more efficient coupling of seismic energy to the formation, than as may occur with sine wave, vibratory generation. A fundamental reason for this is presently believed to reside in the incremental compaction that can occur early in the sequence, resulting in improved coupling of energy over the sequence without significant deleterious effect on the signal processing.

A typical VIBROSEIS contact will involve a compressive bias force of the base plate against the earth of, for example, 30,000 pounds. Superimposed upon this compressive force is a time-varying force of, say, 20,000 pounds peak amplitude. The instantaneous force, therefore, varies from a low value of 10,000 pounds to a peak value of 50,000 lbs. The unconsolidated materials below the base plate can exhibit a time-varying stiffness to the plate, with the impedance being lowest during the period of high instantaneous force and highest during the period of low instantaneous force. This time-varying impedance contributes to a distortion of the transmitted signal, extracting energy from the available power at the fundamental frequency, thereby effectively reducing the fundamental power conversion efficiency, and simultaneously contributing energy to other frequency regions within the transmission band, which energy will contaminate the seismic records, appearing as an increased noise background.

In the case of the non-repetitive force pulse sequence, the same time-varying impedance is present, but may not detract from the power conversion process nearly as much as in the sine-wave case, nor may it contribute as much to background noise. For unipolar pulses, the maximum instantaneous compressive force may be between 100,000 and 200,000 pounds force as contrasted to the 50,000 pound maximum force of the sinusoidal vibrator. With the compaction that can occur from the higher peak force, better seismic energy coupling can be achieved.

The higher peak forces arising from the unipolar force pulse can result initially in yielding of the soil and some settling of the base plate. As the plate or probe reaches a refusal condition, with compacted soil below, a more competent medium exists to accept dynamic energy. The term "refusal" is meant a point where further advance, as of the base plate or other probe, is either below a prescribed rate, or is non-existent. Since the "just refused" condition, whereby minimal or no further advance is observed, may also correspond to a reasonably nonlinear load condition, it may be desirable to reduce the force amplitude thereafter to obtain a more linear load. In this event, more of the energy can go into radiated seismic energy as contrasted to near field internal loss mechanisms.

In one preferred embodiment of this invention, such force reduction occurs naturally. This is the case where, as above described, the power is held constant over the sweep of the force pulse repetition period. Since the power is the product of the blow energy and the frequency of blows, as the repetition frequency increases, the blow energy must reduce. If the frequency of impacts increases by a factor of two, for example, over the pulse train, for constant power, the blow energy must halve in this same time. At the end of the sweep, the force pulse amplitude would be reduced to 0.707 of its value at the beginning of the sweep. Thus, compaction could occur during the early high energy blows, with a more linear, elastic load being observed toward the end of the sweep.

As has been described, the entire transmitted frequency spectrum is generated by each individual unipolar pulse. The effect of the time-varying impedance is to modify the spectrum of the transmitted signal over that obtained with a linear load. In contrast with the linear or analog FM transmission, (Vibroseis) where such nonlinearity is particularly deleterious, in the case of the non-repetitive impulse train, the nonlinear load may not be particularly deleterious, since the spectrum of the energy falls within the desired analysis band and appears as radiated energy.

The system for controlling the pulse generator 16 is illustrated in FIG. 24. The inputs to the system are input pulses $e_R$, which represent the desired sequence of hammer blows which result in the force pulses, and the signal $e_B$ which is an analog signal level, such for example as a step signal (e.g., constant level for constant amplitude force pulses, or a staircase where the force pulse amplitude varies from blow to blow). Each step of the staircase represents the force pulse amplitude or energy to be delivered by the next hammer blow, i.e., by the next blow in the sequence.

The control signals $e_R$ and $e_B$ depend upon the force pulse sequence or format which is desired and may for example by one of the exemplary sequences or formats discussed above. These control signals may be recorded on magnetic tape and reproduced or they may be generated by an electronic signal function generator. The signals may originate at a remote point, say when it is desired to synchronously generate force pulses at each of several generators as may be mounted on mobile carriers such as described in connection with FIG. 1. In such case each carrier is equipped with a receiver 160 which receives signals from a master transmitter. Alternatively, a control signal generator 162 which may be a magnetic tape play back unit or a function generator as described above, is used to provide the control signal. A double-pole double-throw switch 164 is used to select the control signals, either from the receiver 160 or the generator 162.

Other inputs to the control system are provided by the displacement sensor 118 and the pressure sensors 114 and 116 (see FIG. 2). The timing signal generator 112 is constituted of a parameter generator 166 and a timing generator 168. The parameter generator is responsive to the displacement signal $X_H$ from the displacement sensor 118 and provides an output signal representing the velocity of the hammer $V_H$. The outputs of the pressure sensors 114 and 116 are utilized in the parameter generator 166 to provide an output corresponding to the force on the piston 62 which is proportional to the difference between the supply and the return pressure and is indicated as $\kappa \Delta P$. As noted previously, $\Delta P$ is proportional to $F_D$, which is the force on the hammer 60 as applied to the piston 62 thereof.

The displacement signal $X_H$, the hammer velocity signal $V_H$, and the $\kappa \Delta P$ signal, are all inputed to the timing generator 168. The timing generator provides signals at instants $T_{S1}$, $T_{S2}$, $T_{S3}$, which are determinative of the repetition frequency $f_R$ and the force pulse amplitude. Also provided by the timing generator 168 are "dither" signals at instants $T_{DT1}$ and $T_{DT2}$. These dither signals are utilized in order to displace the hammer incrementally to execute a stroke commensurate with the desired force pulse amplitude and energy. These signals at $T_{S1}$, $T_{S2}$, $T_{S3}$, $T_{DT1}$ and $T_{DT2}$ are digital signals which have but three levels, $+e_V$ a positive level, $-e_V$ a negative level, or $e_V=0$ a null or zero level. They are amplified in a valve driver amplifier 170 and applied to a servo valve 172. As dictated by the valve control signal $e_V$, the valve 172 has three states, namely a first state in which the valve ports supply an upward force to the hammer 60, a second state where the valve ports are closed and a third state where the valve ports are reversed from the first state to supply downward force to the hammer. The servo valve 172 may be an electrohydraulic valve; which is part of the control unit 50 (FIG. 1). A commercially available valve such as of type No. 30 supplied by MOOG, INC., of East Aurora, N.Y., may be suitable.

The timing generator 168 is operative such that the signal corresponding to valve ports closed, i.e., $e_V=0$, does not occur when the hammer has any appreciable velocity such that hydraulic fluid would be flowing through the valve 172. The condition that the valve not be put into the closed state when the hammer has appreciable velocity is predicated upon avoidance of the introduction of instantaneous high pressures which would occur when the valve closes which could cause failure in the valve components or elsewhere in the pulse generator.

The four timing instants $T_{S0}$, $T_{S1}$, $T_{S2}$, and $T_{S3}$ are shown in FIGS. 25 (b) and 26, and have been discussed above in connection with these figures and Equations (14) through (19). How the timing generator 112 (viz., the parameter generator 166, and the timing generator 168) are implemented to derive these signals, is illustrated in FIG. 24(a).

It will be noted as the description proceeds that the components making up the signal generator 112 are conventional digital or analog computer type components which may be procured in integrated circuit form or designed from discrete components in accordance with techniques known in the art.

The hammer displacement signal $X_H$ is applied to a differentiating circuit 174 in the parameter generator 166 to provide the hammer velocity signal $V_H$. The hammer cycle begins with hammer lift-off at time $T_{S0}$, which as shown in FIG. 25(b) is determined by a positive crossing of the zero displacement level by the hammer displacement signal $X_H$. This instant is determined by a comparator 176 which changes from a negative to positive state when the $X_H$ signal crosses the zero displacement level (viz., when lift-off occurs). This is identified as the positive transition of the output from the comparator 176, since one of the differential inputs thereof is the $X_H$ signal while the other is ground (zero signal level). $X_H$ is adjusted such that zero displacement is represented by a zero signal level.

The rebound hammer velocity $V_R$ enters into the computation of $T_{S1}$. $V_R$ is measured by means of a sample and hold circuit 178. The sampling event is the timing instant $T_{S0}$ which is obtained from the comparator 176. The circuit 178 then samples and holds the velocity $V_H$ which is the rebound velocity of the hammer. It was noted above that the rebound velocity $V_R$ is the slope of the hammer displacement at the time $T_{S0}$.

The instant $T_{S1}$ is determined utilizing the signal from the comparator indicating the time $T_{S0}$, the rebound velocity signal $V_R$ from the sample and hold circuit, the differential pressure signal $\Delta P$ and the control signal $e_B$. The $e_B$ control signal may be varied by a potentiometer 180 so as to set the nominal below energy (i.e., force pulse amplitude) for the particular pulse generator. The $\Delta P$ signal is obtained from a difference amplifier 182 in the parameter generator 166. The instant $T_{S1}$ may be re-expressed in terms of the energy control signal $e_B$ and the differential pressure signal $\Delta P$ using Equation (15) as follows:

$$T_{S1} = -K_1 \frac{V_R}{\Delta P} + \frac{K_2}{\Delta P} \sqrt{e_B + K_S V_R^2} \tag{36}$$

Equation 36 is implemented by a subsystem 184 in the timing generator 168. In this subsystem 184 the rebound velocity signals $V_R$ is inverted in an inverting operational amplifier 186 to provide $-V_R$. The signal is also applied to a squaring circuit 188 so as to provide $V_R^2$. The $V_R^2$ signal is added to the $e_B$ control signal in a summing circuit 192. The square root of the summing circuit output is taken in a square root circuit 194. The square root circuit 194 output is summed with $-V_R$ in a summing circuit 200. The summing circuit 200 output is divided by the $\Delta P$ signal in a dividing circuit 198. The dividing circuit 198 provides the output proportional to the time different between $T_{S0}$ and $T_{S1}$. The constants indentified in Eq. 36 are accounted for by gain adjustments in the individual computational modules.

To define $T_{S1}$, a one-shot multi-vibrator 202 is used. The one-shot delay time is set by the output of the subsystem 184 taken from the dividing circuit 198 and applied to the control or C input of the one shot 202. The one-shot delay is initiated by the $T_{S0}$ signal which is applied to the trigger input T thereof. Accordingly, the one shot provides, at its Q output, the output pulse as a transition from a logical "0" to a logical "1" level at instant $T_{S0}$ followed, after the delay time determined by the subsystem 184, by a transition from a logical "1" to a logical "0".

The timing instant $T_{S2}$ is determined by the zero value for the velocity signal $V_H$. It is at this instant that the valve 172 can be returned to the center or off position. $T_{S2}$ is obtained through the use of a comparator 204 which compares the velocity signal $V_H$ to zero (ground). The comparator 204 provides a level having a transition from "1" to "0" when $V_H$ passes through "0". An inverting amplifier 206 provides a positive logical transition from "0" to "1" at the timing instant $T_{S2}$.

The timing instant $T_{S3}$ is, as seen in FIGS. 25(b) and 26, the instant when the hammer is accelerated downwardly so as to generate the next force pulse. Rather than providing $T_{S3}$ at the instant when the next control pulse $e_R$ occurs, it is provided a delay $T_d$ after the occurrence of the $e_R$ pulse. This is done so as to stabilize the control system and allow sufficient time for the adjustment of the hammer's downward stroke, $X_S$, which varies with the blow energy signal $e_B$ and the accelerating force signal $\Delta P$.

This delay time $T_d$ is obtained by estimating the hammer fall time $T_f$ for each $e_B$, corrected for the sensed values of $P_S$, $P_R$, and $X_S$, and subtracting the fall time from a fixed delay T, which is a fixed interval after occurrence of the control pulse $e_R$. Since the force pulses occur a fixed delay later than the control pulses, the only consequence is that the force pulses are transmitted a time delay T later than the control pulses which originate from the control signal generator 162, or that are received by the receiver 160 (FIG. 24).

The fixed delay thus has two portions. The delay time $T_d$ and the hammer fall time $T_f$. The delay time is expressed as $$T_d = T - T_f \tag{37}$$

The hammer fall time may be derived from the energy relationships (see Equations 14 and 17) and is given by the proportionality $$T_f \alpha \sqrt{\frac{e_B}{P}} \tag{38}$$

Accordingly, the desired delay time is $$T_d = T - K_4 \sqrt{\frac{e_B}{P}} \tag{39}$$

The relationship expressed in Equation 39 is implemented by the analog circuitry consisting of a square root circuit 208, a dividing circuit 210, an inverting amplifier 212 and a summing circuit 214. The square root of the energy for blow level $e_B$ is derived by the square root circuit 208 and is divided by the pressure differential $\Delta P$ in the dividing circuit 210. The sign is changed in the inverting amplifier 212 and applied to the summing circuit 214, wherein it is added to a level e corresponding to the fixed delay time T.

The output from the summing circuit is proportional to $T_d$ and sets the delay time of a one-shot multivibrator 216. The multivibrator is triggered by each $e_R$ pulse and generates the $T_{S3}$ timing instant as the transition from "0" to "1" in the level at the output of the one shot 216.

The "dither" signals at $T_{DT1}$ and $T_{DT2}$ which create a series of valve openings and reversals which cause the hammer to slowly move upward or downward, is derived using the energy for blow level $e_B$ and the accelerating force level which is indicated by $\Delta P$ to determine the desired drop height or hammer stroke $X_S$. $X_S$ is determined by the following proportionality $$X_S \alpha (e_B/\Delta P) \tag{40}$$

The necessary adjustments for "dither" in the hammer height is obtained by comparing $X_S$ with the hammer displacement signal $X_H$ and developing dither signals of duration equal to the desired valve incremental opening time $T_o$. The sense of these dither signals, whether logical "1" or logical "0" then determines whether the control valve will be open in the forward direction (the first state) to provide upward acceleration to the hammer or reversed to provide downward acceleration to the hammer. The desired stroke $X_S$ is obtained by dividing the energy per blow signal $e_B$ by the $\Delta P$ signal in a dividing circuit 218. This desired drop height $X_S$ is subtracted from the actual hammer displacement $X_H$ through the use of a summing circuit 220 and an inverting amplifier 222. When the desired drop height is reached the difference signal from the summing circuit 220 becomes equal to "0". The incremental dither signals at $T_{DT1}$ and $T_{DT2}$, which are digital signals are obtained by a dither signal generator 224. At the input of the generator 224 are a pair of comparators 226 and 228. Positive and negative reference voltages $+E_D$ and $-E_D$ establish a dead band equal to $2E_D$. When the input signal from the summing circuit 220 is of such an amplitude, either positive or negative, as is greater than the dead band, either the comparator 226 or the comparator 228 will provide an output. The dead band voltages $E_D$ are selected to be larger than the incremental dither step. Thus, hunting (alternate raising and lowering of the hammer which can waste power and cause unnecessary wear) is substantially eliminated.

The dither system 224 is provided with clock signals having a period equal to one-half the desired period $t_0$ of the dither step. These clock signals are applied to the clock inputs of four flip-flops of the JK type 230, 232, 234 and 236.

All of these flip-flops are initially re-set, as by applying a reset pulse to a DC reset input thereof (not shown to simplify the illustration).

Consider that an UP command to move the hammer upwardly is obtained from the comparator 226. A first AND gate 238 is then enabled and conditions the flip-flop 230 to be set by the next clock pulse (the first clock pulse in the dither sequence). The Q output of flip-flop 230 is applied, through an OR gate 240, an enabled AND gate 244 and an OR gate 242, to the input of the drive amplifier 170 which results in the UP or $+e_V$ command to the servo valve 172. The AND gate 244 is enabled between the timing instants $T_{S2}$ and $T_{S3}$ by means of a flip-flop latch 246. The output from the OR gate 240 thus provides the UP control dither signals at $T_{DT1}$.

When flip-flop 230 is set the AND gate 238 is inhibited. Another AND gate 248 is enabled. A NOR gate 250 also receives a logical "1" level which inhibits another AND gate 252. The down output from the downward control comparator 228 is thereby inhibited from causing a downward command, thus preventing the generation of conflicting valve control signals. The latter action is a precaution against any accidental reversal of valve control during the dither sequence.

The next clock pulse (the second clock pulse in the dither sequence) sets flip-flop 232. A down command is then applied to the negative input of the drive amplifier 170 by way of an OR gate 254 and AND gate 256, which is enabled during the period between $T_{S2}$ and $T_{S3}$ by the latch 246, and another OR gate 258. During the second clock pulse period, the NOR gate 250 receives a logical "1" input from the Q output of flip-flop 232 so that outputs from the comparator 228 continue to be inhibited by the AND gate 252. The second clock pulse also resets the flip-flop 230 and causes the UP command to be cancelled.

On the third clock pulse in the dither sequence, flip-flop 232 is reset. It will therefore be observed that for the first clock pulse period the servo valve 172 is presented with an UP command $(+e_V)$ and on the second clock pulse period by a down command, both during equal time increments $t_0/2$. The hammer then will have accelerated upwardly and then downwardly to "O" velocity such that the valve can safely be closed. This completes one dither sequence with the hammer having moved incrementally upward. At the end of the sequence, the flip-flops 230 and 232 have returned to their reset states. If the UP command from the comparator 226 is still present, another upward dither sequence will be initiated and the hammer will have moved upwardly during the next clock pulse period when an upward acceleration command $+e_V$ is generated and then decelerated again to "O" during the succeeding clock pulse period such that the valve 172 can again be closed. It can be seen therefore that twice the clock pulse period is equal to a dither time increment. Thus, the hammer 60 is caused to move at a controlled rate, stepwise driving successive dither increments, until the desired elevation, and stroke $X_S$, is reached. Then, the output from both comparators 226 and 228 are logical zero levels.

The dither sequence which will cause the hammer to move incrementally downward (viz., lower the hammer) is obtained through the use of the flip-flop 234 and 236, the AND gate 252, another OR gate 258 and another NOR gate 260. The sequence of dither signals at instants $T_{DT2}$ and $T_{DT1}$ ($T_{DT1}$ follows $T_{DT2}$, for the DOWN dither sequence) is generated in a manner similar to that described above in connection with an UP dither sequence.

The control of the hammer 60 through the actuation of the servo valve 172 is obtained by applying the outputs of the one-shot 202 via the OR gates 242 and 258, to the drive amplifier 170. The one shot 202 output is a pulse having leading and trailing edges at $T_{S0}$ and $T_{S1}$, respectively. This pulse is gated by a pair of AND gates 264 and 266. From FIGS. 25(b) and 26, it will be seen that the control of the valve 172 begins between $T_{S0}$ and $T_{S1}$ when the control valve 172 is opened in a forward direction so as to provide pressure differential with respect to the piston drive areas of the hammer 60 resulting in forces to drive the hammer in the upward direction. Between $T_{S1}$ and $T_{S2}$ the valve 172 is reversed so as to provide forces on the hammer to decelerate the hammer to approximately zero velocity. Between $T_{S2}$ and $T_{S3}$ the dither signals are generated. From $T_{S3}$ to the time of impact at $T_0'$, the valve 173 is opened again in the forward direction to drive the hammer down to impact position. Between $T_0$ and $T_{S0}$ the force is continued downward to provide the maximum energy delivery to the load.

The flip-flop 246 is set at $T_{S3}$ such that the Q output level thereof enables the AND gate 263 and 266. The positive logical "1" level from the Q output of the one shot 202 is then applied at $T_{S0}$, via the AND gate 264 and the OR gate 242, to generate a $+e_V$ control signal which opens the serve valve 172 in the foward direction to produce the forces which drive the hammer 60 upwardly. At $T_{S1}$ and $\overline{Q}$ output of the one shot 202 becomes a logical "1" level and passes through the enabled AND gate 266 and the OR gate 258 to the minus input of the amplifier 170. An $-e_V$ control signal is then generated and applied to reverse the servo valve 172. At $T_{S2}$ the flip-flop 246 is reset such that both of the gates 264 and 266 are inhibited. This reset takes place when the hammer reaches zero velocity, as determined by a negative transition in the level from the comparator 204. The inverting amplifier 206 provides a positive signal at $T_{S2}$ which resets the flip flop 246. Then the dither signals at $T_{DT1}$ and $T_{DT2}$ are applied to adjust the position of the hammer to the height $X_S$, which will deliver the requisite blow energy dictated by $e_B$ on the next impact. At $T_{S3}$ the flip-flop 246 is reset and the AND gates 264 and 266 are again enabled. Since the Q output of the one shot 202 is then a logical "1", it passes through the enabled AND gate 266 and the OR gate 258 so as to generate the $+e_V$ signal which causes the hammer to be driven downward to impact for the impact time which extends from $T_0$ to $T_{S0}$. At $T_{S0}$ the next force pulse in the sequence is generated.

FIG. 27, to which reference is now made, illustrates the control valve system 50 as being made up of the servo valve 172 and a four-way power stage spool valve 360. The spool valve 360 is driven at spool end areas 361 and 362 via passageways 363 and 364 through the servo valve 172. The servo valve 172 receives the electrical control signal input $e_V$ at a terminal 366. Optionally, as shown by the dashed lines, a feedback connection 367 may be provided between a power spool valve position sensing transducer 359 and the servo valve 172 for closed loop operation with DC position stability for the power spool valve 360. An amplifier 358 is shown in the feedback path to set the gain thereof. The feedback signal $E_S$ may be summed with the control signals $e_V$ as shown in FIG. 24A. Alternatively hydraulic feedback may be used for stabilization, as by means of the techniques described in U.S. Pat. No. 3,461,910.

The power stage spool valve 360 is connected via the lines 104 and 106 to receive supply pressure $P_S$ and return pressure $P_R$ from the hydraulic power supply (22, FIG. 1). Teed into the supply and return paths are the two accumulators 108 and 110. Supply pressure, $P_S$, is then present at ports 369 and 370 on either side of the center land of the spool valve 360. Return pressure, $P_R$, is present at ports 368 and 371 on the inner edges of the outer lands of the valve 360. When the spool valve 360 is in its neutral or closed position, the ports 368, 369, 370, 371 are in line-to-line relationship.

If the spool valve 360 is driven upwards as viewed in FIG. 27, ports 368 and 370 will be opened while ports 369 and 371 will remain closed. Then supply pressure is presented to the lower side of the piston 62 of the hammer 60 and return pressure is presented to the upper side of the piston 62. If the areas of both sides of the piston 62 are the same and equal to $A_P$, the driving force $F_D$ on the piston-hammer is $$F_D = -(P_S - P_R) A_P, \quad (41)$$

neglecting any pressure drop across the ports themselves. $F_D$ has a negative sign convention to make the force polarity conform to the sign convention of FIG. 25.

If the spool valve 360 is now driven downward, the alternate ports are opened and $$F_D = (P_S - P_R) A_P \quad (42)$$

With zero control signal applied ($e_V = 0$), the power spool 360 remains in its centered position. All of the ports 368, 369, 370 and 371 are closed and the piston is locked such that, over the short term, it can not move.

The response time of the hydraulic force-switching amplifier (servo valve 172 and power state valve 360) is desirably short compared to the intervals between switching times $T_{S0}$, $T_{S1}$, $T_{S2}$, and $T_{S3}$, as shown in FIGS. 25 and 26.

By using hammer rebound velocity $V_R$, the time the upward accelerating force, $-F_D$, is applied to insure recovery to position $X_S$ can be shortened, and the switching time $T_{S1}$ can be advanced (see FIG. 25). The reduction in the duration $T_{S1} - T_{S0}$, and the advance of $T_{S1}$, is accompanied by a reduction in the work done by the hydraulic system to enable the hammer 60 to recover to position $X_S$. Thus efficiency is enhanced. For example, if the impact system were lossless and the rebound velocity, $V_R$, equalled the impact velocity $V_S$, the switching time $T_{S1}$ would be identical to $T_{S0}$, there would be no application of $-F_D$, and the average hydraulic volume displacement would be zero.

FIG. 28 shows a pulse generator 400 having a valve control unit 50 in which a three-way power stage spool valve 402 is employed. The three-way spool valve 402 connects via a line 404 to the upper cavity 74 only. The upper cavity 74 is defined in the housing 56 by the top side 407 of the piston 406 of the hammer 60. The lower cavity 76 is connected via a line 408, at all times, to the supply pressure line 104 and to the supply accumulator 108. The piston 406 is a differential area piston in that the bottom side 409 drive surface of the piston 406, which is exposed continuously to supply pressure in the lower cavity 76, is smaller in area than the top side 407 drive surface. The surface 407 is exposed to pressure in the cavity 74. Suitably, the area ratio of the top and bottom drive surfaces 407 and 409 is two to one (2:1).

If the area of the surface 409 is $A_P$, then the area of the surface 407 is $2A_P$. Thus, as the spool valve 402 switches the pressure in cavity 123 between $P_S$ and $P_R$, the following force-states result $$\left.\begin{array}{l} F_D + = P_S(2A_P) - P_S A_P \\ F_D + = P_S A_P \\ F_D - = P_R(2A_P) - P_S A_P \end{array}\right\} \quad (43)$$

The three-way power spool valve 402 is connected via the lines 104 and 106 to receive supply pressure $P_S$ and return pressure $P_R$ from the hydraulic power supply (22, FIG. 1). The accumulators 108 and 110 are teed into these lines 104 and 106. Supply pressure, $P_S$ is then present at a port 469 while return pressure is present at another port 468. These ports 468 and 469 are at the inner edges of the outer lands of the valve 402. When the spool valve 402 is in its neutral or closed position, the ports 468 and 469 are in line-to-line relationship. The valve 402 is driven upwardly by supply pressure applied through the line 463 and return pressure applied through the line 464 to the drive surfaces 461 and 462 of the valve 402. Then return pressure is connected to the upper cavity 74 via the line 404 and is presented to the upper side 407 of the piston 406. Supply pressure is continuously applied to the cavity 76 via the line 408 and is presented to the bottom surface 409 of the piston 406. The hammer 60 is thus driven up.

When the valve 402 is driven downwardly the ports 469 open while ports 468 close. Then supply pressure is applied to the upper cavity 74. Since the drive area of the side 407 is twice the area of the side 409 the piston 60 is driven down. The forces applied to the piston are as set forth in Equation (43).

A feedback connection, as indicated in the dash line may be provided by way of a position transducer 459 and an amplifier 458 from the power spool 402 to the servo valve 172 for purposes of DC stabilization, or other stabilization means may be used as discussed in connection with FIG. 27.

FIG. 29 illustrates a pulse generator 500 having a power stage valve 502 in concentric relationship to the hammer 60. The valve 502 has a sliding fit to the bore 58 of the pulse generator housing 56. A step 504 in the mid-section of the valve 502 fits in a step 506 of the bore 58 so as to provide two drive cavities 510 and 512 for the valve 502. These drive cavities 510 and 512 are coupled via lines 514 and 516 to the outlet ports of the servo valve 172. The servo valve 172 also receives supply and return pressure from supply and return lines 104 and 106. The lines which connect the valve 172 to the supply and return lines 104 and 106 are not shown to simplify the illustration.

Circular grooves 520 and 522 are cut in the bore 58 to provide ports 524 and 526. These ports 524 and 526 connect the upper cavity 528, which is defined in the housing bore 58 by the hammer piston 530, to return and supply galleries 532 and 534. The supply gallery 534 connects to the supply line 104 and is closely coupled to a supply pressure accumulator 536. The return gallery 532 is coupled to the return line 106 and is also coupled to a return accumulator 538.

The operation of the control valve system shown in FIG. 29 is similar to the operation of the three-way valve shown in FIG. 28. The control signals $e_V$, which are applied to the servo valve 172, switch the pressure in the valve drive cavities 510 and 512 so as to cause the valve 504 to move upwardly or downwardly thereby opening and closing the ports 524 and 526 so as to switch the pressure in the drive cavity 528 from supply to return. The piston 530 is a differential area piston. The lower side of the piston 530 is continuously presented to supply pressure in a lower cavity 542 which is connected to the supply gallery 534. Accordingly, as the valve 504 is driven upwardly the hammer 60 will be driven downwardly. Conversely, when the valve 504 is driven downwardly the port 524 opens and the hammer is driven upwardly along the return stroke to the desired displacement $X_S$. The repetition frequency and the amplitude of the force pulses generated by the generator 500 can therefore be controlled in the same manner as and for the purpose described above.

FIG. 30 shows the shaped force pulse generator provided by the invention adapted for marine (underwater) signalling applications. A force pulse generator 600 which may be of the design described in connection with FIGS. 2, 27, 28 or 29 is provided with hydraulic supply and return pressure by way of lines 602 and 604. The timing signal generator is contained is the same housing as the pulse generator and the control signal $e_R$ and $e_B$ are connected to the generator 600 at terminals 606 and 608. Alternatively, the timing signal generator may be disposed remotely, as at the surface, and the control signals $e_V$ applied to the pulse generator 600.

The generator 600 has a hammer 610 which impacts upon an impact spring provided by a receiver piston 612 which is movable into a volume 614 of hydraulic fluid, suitably hydraulic oil. The volume 614 and the piston 612 are integral with a radiator 616 which interfaces with the water into which the signals are to be projected. The base of the radiator 616 may be a cylindrical surface that slides along a bore 620 of the housing 622 for the generator 600. Suitable seals, shown as an "O" ring 624, isolate the interior of the generator 600 from the surrounding water environment. The internal pressure within the housing 622 may be ambient pressure (atmospheric pressure at the surface). The pressurization may be maintained by way of a line 626 so as to enable the internal pressure $P_I$ to be set at the surface. This internal pressure is of course much less than the pressure of the underwater environment which is indicated as $P_0$.

As shown in FIG. 31, upon impact of the hammer 610 upon the receiver piston 612, the radiator 616 is driven outwardly by the elevated pressure in the liquid spring due to the entry of the piston 612 into the liquid volume 614. As the radiator accelerates outwardly into the water, a positive pressure pulse is generated. This pulse is illustrated in FIG. 32. The magnitude of the pulse along the axis of the radiator 616 is given approximately by the expression $$P(r) = (\rho a^2 / 4r \, a) \tag{44}$$

where a is the radius of the radiator 616, A is the acceleration of the radiator, and r is the distance along the axis of the radiator to the observation point. $\rho$ is the density of the water surrounding the generator 600. The time duration of the pressure pulse is controlled by the duration of the outward acceleration of the radiator 616, which in turn is controlled by the mass of the piston $M_H$, the mass of the radiator 616 including the receiver piston 612, the liquid volume 614 and the other parts which are movable with the radiator 616. This mass is $M_R$. Also determining the pulse duration is the inertia of the water load $M_I$ and the stiffness of the liquid spring $K_I$. The pressure differential $P_0 - P_I$ re-seats the radiator 616 against the generator housing 622 after each pulse. The radiator is formed with a flange 628 which may engage a ring of cushioning material 630 attached to the forward end of the housing 622. This ring 630 serves to cushion the impact of the reseating event.

From the foregoing description it will be apparent that there has been provided improved methods and apparatus for carrying out seismic exploration both on land and in underwater environments. While various preferred embodiments of the methods and apparatus provided by the invention have been described herein, it will be apparent that variations and modifications thereof within the scope of the invention will undoubtedly suggest themselves to those skilled in the art. Accordingly, the foregoing description should be taken merely as illustrative and not in any limiting sense.

What is claimed is:

1. The method of generating a seismic transmission having an energy spectrum extending over a frequency range for use in a seismic exploration system, comprising the steps of
    (a) generating a plurality of sequences of pulses which are transmitted, which pulses are swept monotonically in repetition frequency, each sequence having a different lower pulse repetition frequency and a different upper pulse repetition frequency, said repetition frequencies falling within said frequency range, each of said pulses in any one of said sequences having a useful energy spectrum which extends beyond the highest repetition frequency of the sequence in which it is contained, and
    (b) controlling the variation of the energy and timing of said pulses within any one of said sequences, and with respect to all of said sequences, such that the mean variation in the energy spectrum level over said frequency range is minimized for said transmission of all said sequences.

2. The invention as set forth in claim 1 wherein said generating step is carried out with the aid of a hammer of mass $M_H$ and an impact spring of stiffness $K_I$ and comprises driving said hammer into oscillation toward and away from an interface with the medium into which said pulses are transmitted and controlling the time duration of said pulses by the magnitudes of $K_I$ and $M_H$.

3. The invention as set forth in claim 2 wherein said duration of each of said pulses is approximately the reciprocal of $$\frac{0.6}{\pi} \sqrt{\frac{K_I}{M_H}}$$

4. The invention as set forth in claim 2 wherein said impact spring is a liquid spring.

5. The invention as set forth in claim 4 wherein said interface is provided by a coupling member which contains said liquid spring.

6. The invention as set forth in claim 1 wherein the repetition frequency of each of said sequences sweeps over an octave frequency band or less.

7. The invention as set forth in claim 6 wherein the frequency bands over which said sequences sweep are ordered successively such that the entire range between said lowest and highest repetition frequency is swept during said transmission.

8. The invention as set forth in claim 7 wherein said sequences follow each other one after the other.

9. The invention as set forth in claim 1 wherein the repetition frequency of a first of said sequences sweeps over a first frequency band not exceeding an octave, such that the harmonics of said first sequence produce spectral energy in a plurality of harmonic panels which extend over said frequency range, and the others of said sequences sweep over other frequency bands which overlap said harmonic panels such that the summation of the spectral levels in said first band and said harmonic panels has substantially constant mean spectral level.

10. The invention as set forth in claim 1 wherein the controlling of the variation of the energy and timing of said pulses is carried out by steps selected from varying the repetition frequency of said pulses in said sequences as a function of time, varying the amplitude of said pulses as a function of the repetition frequency and controlling the duration of said sequences.

11. The invention as set forth in claim 10 wherein the variation of said repetition frequency $f_R$ as a function of time, t, is $$f_R(t) = f_o 2^{\frac{t}{\tau}}$$

where $f_0$, in each of said sequences, is the lower repetition frequency thereof and $\tau$ is the time duration corresponding to a sweep of one octave of said repetition frequency, and the variation of the amplitude of the pulses in each of said sequences is proportional to $f_R - \frac{1}{2}$.

12. The invention as set forth in claim 10 wherein the variation of said repetition frequency $f_R$ as a function of time t is $$f_R(t) = f_0(1 + t/T)$$

where $f_o$ is, in each of said sequences, the lower repetition frequency thereof and T is a constant related to the time duration of each said sequences and the upper repetition frequency thereof, and the amplitude of the pulses is maintained constant in each of said sequences.

13. The invention as set forth in claim 10 wherein said sequences comprise a first sequence which sweeps between a first repetition frequency and a second repetition frequency twice said first repetition frequency, a second sequence which sweeps between said second repetition frequency and a third repetition frequency thrice said first repetition frequency and a third sequence which sweeps between said third repetition frequency and a fourth repetition frequency five times said first repetition frequency, said step of controlling the variation of the energy and timing of said pulses being carried out such that the energy spectrum level in said second sequence is approximately half the energy spectrum level in said first sequence and the energy spectrum level in said third sequence is approximately one sixth the energy spectrum level in said first sequence.

14. The invention as set forth in claim 13 wherein said step of controlling the variation of the energy and timing of said pulses is carried out by varying the repetition frequency $f_R$ as a function of time, t, such that $$f_R(t) = f_o 2^{\frac{t}{\tau}}$$

where $f_0$, in each of said sequences, is the lower repetition frequency thereof and $\tau$ is the time duration corresponding to a sweep of one octave of said repetition frequency, and the variation of the amplitude of the pulses in each of said sequences is proportional to $f_R - \frac{1}{2}$.

15. The invention as set forth in claim 13 wherein said step of controlling the variation of the energy and timing of said pulses is carried out by varying the repetition frequency $f_R$ as a function of time, t, such that $$f_R(t) = (1 + t/T)$$

where $f_0$ is, in each of said sequences, the lower repetition frequency thereof and T is a constant related to the time duration of each of said sequences and the upper repetition frequency thereof, and the amplitude of the pulses is maintained constant in each of said sequences.

16. The invention as set forth in claim 13 wherein the step of controlling the variation of the energy and timing of said pulses is carried out by controlling the duration of said sequences such that the duration of said second sequence is one half the duration of said first sequence and the duration of said third sequence is one-sixth the duration of said first sequence.

17. The invention as set forth in claim 1 wherein the repetition frequencies of each of said sequences lie in a plurality of contiguous frequency bands, each band covering a different part of said frequency range, said bands being related in frequency such that harmonic panels in each of said sequences cover different and non-overlapping frequencies within said frequency range.

18. The method of generating seismic signals for use in a seismic exploration system comprising the steps of
    (a) generating a sequence of pulses which sweep in repetition frequency during a transmission over a first band, and (b) modulating said sweep at a rate which varies over a frequency range which is below said first band.

19. The invention as set forth in claim 18 wherein said modulating step is carried out by inhibiting the generation of different ones of said pulses which succeed each other in predetermined order.

20. The invention as set forth in claim 19 wherein said inhibited events are successive pairs of said pulses which occur alternately in said sequence.

21. Seismic signal generation apparatus for producing in a receiving medium a transmission consisting of a sequence of pulses, said sequence being useful in a correlation process for high resolution seismic exploration, said apparatus comprising a housing a hammer mounted for reciprocation in said housing for oscillation over a trajectory away from and toward an impact position, means for receiving impacts from said hammer and for applying controlled force pulses to said receiving medium, said means including an impact spring for controlling the spectrum of individual ones of said pulses, said housing and hammer defining cavities for pressurized hydraulic fluid which is applied to said hammer for displacing said hammer over said trajectory, valve means in communication with at least one of said cavities for switching the pressure of the hydraulic fluid applied to the hammer, and control means for said valve means to time said sequence of pulses such that the autocorrelation function of said transmission exhibits low side lobes.

22. The invention as set forth in claim 21 wherein said valve means is electrically controlled, and said control means is responsive to an impact electrical control signal sequence for providing said sequence of pulses in the same time relationship as said electrical control signal sequence.

23. The invention as set forth in claim 21 wherein said control means includes means for changing the timing of said sequence of pulses such that the repetition frequency of said pulses is swept over at least one octave.

24. The invention as set forth in claim 22 further comprising means for generating second control signals representing the amplitude of each pulse in said sequence of pulses in said transmission, and wherein said control means includes means responsive to the first control signals of said control signal sequence and said second control signals for operating said valve means to time the switching of the pressure of said hydraulic fluid in at least said one cavity whereby to control the timing and amplitude of said pulses in said sequence.

25. The invention as set forth in claim 24 further comprising means responsive to the displacement of said hammer for producing third signals, means included in said control means responsive to said third signals also for varying the timing of the switching of said hydraulic fluid pressure in at least said one cavity to control the timing and amplitude of said pulses in said sequence.

26. The invention as set forth in claim 25 wherein said control means includes means responsive to said third signals for generating fourth and fifth signals corresponding to the location and velocity of said hammer along its trajectory, and means responsive to said fourth and fifth signals also for varying the timing of the switching of said hydraulic fluid pressure in at least said one cavity to control the timing and amplitude of said pulses in said sequence.

27. The invention as set forth in claim 25 further comprising means responsive to the pressure of said hydraulic fluid for providing a sixth control signal corresponding to the pressure difference across said hammer, and said control means including also means responsive to said sixth signal for varying the timing of the switching of said pressure in at least said one cavity to control the timing and amplitude of said pulses in said sequence.

28. The invention as set forth in claim 21 wherein said valve means includes a first valve operated by said electrical signals and a power stage valve operated by said first valve for switching said pressure in at least said one cavity.

29. The invention as set forth in claim 28 wherein said power stage valve is a four-way valve and said housing has a pair of cavities with which said hammer is in communication and in which the pressure of said fluid is switched.

30. The invention as set forth in claim 28 wherein said power stage valve is a three-way valve in communication with said one cavity.

31. The invention as set forth in claim 28 wherein said power stage valve is a tubular valve disposed in said one cavity and around said hammer.

32. The invention as set forth in claim 27 wherein said control means includes means operated by said first control signal and said second, third and sixth signals to produce digital electrical control signals for operating said valve means to any of first, second, and third positions two of which correspond to application of hydraulic pressure forces in opposite senses to said hammer, and the third of which corresponds to the closed position of said valve means.

33. The invention as set forth in claim 32 wherein said control means further includes means responsive to said first control signal and said second, third and sixth signals for generating dither signals and applying said dither signals selectively to said valve means.

34. The invention as set forth in claim 21 wherein said receiving means comprises a coupling member which defines an interface with the receiving medium, and means for biasing said coupling member in the direction towards said interface.

35. The invention as set forth in claim 34 wherein said impact spring is contained within said coupling member.

36. The invention as set forth in claim 35 wherein said impact spring is a liquid spring comprising a liquid filled chamber in said coupling member and an impact piston movably mounted in said coupling member and having opposite faces respectively opposed to said chamber and to said hammer.

37. The invention as set forth in claim 34 wherein said spring has a stiffness $K_I$ and said hammer has a mass $M_H$, said stiffness and said mass being related by the following equation $$f_o = \frac{0.6}{\pi} \sqrt{\frac{K_I}{M_H}}$$

where $f_0$ is the upper frequency limit of said spectrum.

* * * * *